United States Patent
Hirakawa

(10) Patent No.: US 6,590,620 B1
(45) Date of Patent: Jul. 8, 2003

(54) CRT DISPLAY IMAGE HORIZONTAL DISTORTION CORRECTION DEVICE

(75) Inventor: Haruyasu Hirakawa, Chigasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/463,212

(22) PCT Filed: May 20, 1999

(86) PCT No.: PCT/JP99/02668

§ 371 (c)(1),
(2), (4) Date: Jan. 21, 2000

(87) PCT Pub. No.: WO99/62048

PCT Pub. Date: Dec. 2, 1999

(30) Foreign Application Priority Data

May 22, 1998 (JP) .......................................... 10-140885

(51) Int. Cl.⁷ ............................ H04N 3/22; H04N 3/26; H04N 3/23; H04N 3/223; H04N 9/28; H04N 9/16; H04N 17/00; H04N 17/02; H01J 29/56; H01J 29/58

(52) U.S. Cl. .................... 348/806; 348/805; 348/190; 348/747; 348/745; 348/746; 348/807; 315/371; 315/382; 315/389

(58) Field of Search ............................ 348/806, 805, 348/190, 747, 745, 746, 807, 540; 315/371, 382, 389

(56) References Cited

U.S. PATENT DOCUMENTS 4,510,527 A * 4/1985 den Hollander ............ 358/158
4,992,706 A * 2/1991 Troemel et al. ............. 315/368
5,399,945 A * 3/1995 Haferl ........................ 315/371
5,448,140 A * 9/1995 Douken et al. ............. 315/371
5,475,286 A * 12/1995 Jackson et al. ............. 315/371
5,583,400 A * 12/1996 Hulshof et al. ............. 315/371
5,633,566 A * 5/1997 Boettner et al. ............ 315/371
5,783,913 A * 7/1998 George ...................... 315/371
6,195,123 B1 * 2/2001 Meguro et al. ............. 348/190

FOREIGN PATENT DOCUMENTS

| JP | 05145781 | 6/1993 |
| JP | 07253762 | 10/1995 |
| JP | 09149284 | 6/1997 |
| JP | 10075381 | 3/1998 |

* cited by examiner

Primary Examiner—John Miller
Assistant Examiner—Paulos M. Natnael
(74) Attorney, Agent, or Firm—Wenderoth, Lind & Ponack, L.L.P.

(57) ABSTRACT

In a CRT display apparatus, a horizontal distortion correction apparatus is provided for correcting horizontal distortion of an image by applying a residual phase to control the phase of a horizontal deflection current. The horizontal distortion correction apparatus corrects horizontal distortion of an image caused by an assembly error of the CRT display apparatus for displaying an image by scanning a video signal, based on a horizontal synchronizing signal included in the video signal. The horizontal distortion correction apparatus includes a PLL supplying the horizontal deflection current to a video signal controller for displaying an image on the CRT. A distortion-correcting waveform generator is operated by the user, applying a wave signal having a desired waveform to the PLL to provide a residual phase for the horizontal deflection current to control the phase thereof. As a result, the image without horizontal distortion is displayed on the CRT display apparatus.

3 Claims, 24 Drawing Sheets

CRT DISPLAY IMAGE HORIZONTAL DISTORTION CORRECTION DEVICE

TECHNICAL FIELD

This invention relates to apparatuses for correcting a horizontal distortion of an image displayed on a CRT display apparatus and, more specifically, to a PLL circuit using a residual phase and a drive circuit of a CRT display apparatus using the PLL circuit.

BACKGROUND ART

In recent years, CRT display apparatuses for computers generally support various scanning frequencies. However, distortion due to assembly accuracy error is inevitable in an image displayed on the CRT display apparatus. Such distortion includes horizontal distortion causing an image to be deformed in the horizontal direction. The horizontal distortion includes center-displaced distortion, parallelogram distortion, and arcuate distortion. The phase of a horizontally-distorted image is shifted in the horizontal direction. To be properly displayed, the distorted image has to be corrected in the horizontal direction. Described briefly below are these horizontal distortions with reference to FIGS. 31, 32, 33, and 34.

First, FIG. 31 shows the relation between an undistorted image and various signals constructing video signals which generate the image. In the drawing, Hysnc denotes a horizontal synchronizing signal generating a pulse with a predetermined period. Ihd denotes a horizontal deflection current. Sv denotes a video signal for one frame. The horizontal deflection current Ihd synchronizes with the horizontal synchronizing signal Hsync, while the horizontal synchronizing signal Hsync and the video signal Sv have a constant temporal relation.

In one example shown in FIG. 31, the processing between time t1 and time t7 is repeated after the time t7. Therefore, described briefly below is the relation between the video signal and the image between the time t1 and the time t7. As shown in the drawing, an H pulse Hp is a pulse signal rising at the time t1, falling at time t3, and rising at the time t7. The horizontal deflection current Ihd reaches its peak value at time t2 in the H pulse Hp, and reaches its minimum value at time t4. The horizontal deflection current Ihd linearly increases from the time t4, and reaches its peak value at the time t8.

In response to the trailing edge of the horizontal deflection current Ihd at the time t4 after a predetermined period (RiL) from the time (time t3) of the trailing edge of the pulse of the horizontal synchronizing signal Hsync, the video signal Sv starts rendering a raster image for one line. The raster image rendering ends at time t6 preceding the time t8 for a predetermined period (RiR). The interval between a raster frame Fr and a video frame Fv corresponding to the period RiL between the time t4 and the time t5 is herein called a left-retrace-line period RiL. Similarly, the interval between the raster frame Fr and the video frame Fv corresponding to the period RiR between the time t6 and the time t8 is herein called a right-retrace-line period RiR.

The image frames displayed on the CRT display apparatus upon receipt of these video signals are laid out as follows. Each image frame is cocentrically displayed with respect to a display frame Fc of a cabinet of the CRT display apparatus, allowing the user to feel quite normal in recognizing the image. For this purpose, the image displayed on the CRT display apparatus includes two types of images, which are distinguished as the raster frame Fr and the video frame Fv. The raster frame Fr is a frame displayed by a collection of scanning lines called raster, being scanned in a range larger than the cabinet display frame Fc.

That is, the raster frame Fr projected on the cabinet display frame Fc can be viewed as the raster frame Fr therethrough. The video frame Fv represents the actual image. In the figure, assuming that the scanning lines runs from the left end to the right, the left-retrace-line RiL from the left end of the raster frame Fr to the left end of the video frame Fv is generally constant. The left-retrace-line RiL is constant because the horizontal deflection current Ihd synchronizes with the horizontal synchronizing signal Hsync, and therefore the temporal relation between the horizontal synchronizing signal Hsync and the video signal Sv is constant. Similarly, the right-retrace-line RiR is also constant.

FIG. 32 shows a state of a distorted image with its center displaced. The raster frame Fr and the video frame Fv are displaced with respect to the cabinet display frame Fc in the horizontal direction, and as a result the video frame Fv is shifted from the center of the cabinet display frame Fc.

FIG. 33 shows a state of an image distorted in a parallelogram shape. The raster frame Fr is distorted to be a parallelogram shape with respect to the cabinet display frame Fc, and as a result the video frame Fv is also distorted in a parallelogram shape.

FIG. 34 shows distortion called arcuate distortion, in which the scan start position (the left end in the drawing) in the raster frame Fr is arcuately shifted, and therefore the video frame Fv is also viewed as arcuately distorted. These horizontal distortions as shown in FIGS. 32, 33, and 34 do not necessarily occur independently, but may occur as combined.

These distortions in the horizontal direction are caused not by the divergence of the relation among the above described horizontal deflection current Ihd, video signal Sv, and horizontal synchronizing signal Hsync which is a start signal of the video signal Sv, but by mechanical mounting accuracy error of a deflection controller mainly including a deflection coil of the CRT, non-uniformity of the generated magnetic field, and other reasons.

Therefore, in recent years, to reduce distortion in the displayed image and maintain image quality, the CRT display apparatus is equipped with a distortion correcting circuit capable of adjusting the amount of correction of the image distortion according to scanning frequencies.

With reference to FIGS. 35 and 36, described below is an example of image distortion due to mechanical mounting accuracy error of the deflection controller. First, FIG. 35 shows a state in which the deflection controller normally mounted on the CRT display apparatus scans the electron beam in the vertical direction. For viewability, the figure does not include components not required for description herein such as a glass tube of the CRT. In this example, the deflection controller is constructed of deflection magnetic poles 6 and their drive circuits (not shown).

An electron beam Eb emitted from an electronic gun 5 collides against a fluorescence surface of the CRT forming a screen, deflected and scanned in the vertical direction by the deflection magnetic poles 6, and viewed as an emission line Lb on the screen. The emission line Lb is vertical with respect to a horizontal line Lh on the display screen of the CRT if the deflection controller is mounted on the CRT display apparatus correctly with respect to the CRT.

On the other hand, FIG. 36 shows a state in which the deflection controller is mounted on the CRT display apparatus, being slightly inclined toward the CRT. In this example, compared with the case in FIG. 35, the deflection magnetic poles 6 are inclined an angle a (not shown) toward the CRT. Consequently, when the deflection magnetic poles 6 deflects the electron beam Eb for scanning in the vertical direction, the emission line Lb on the display screen of the CRT is not vertical but inclined to the horizontal line Lh. This is the main reason for the parallelogram distortion.

In other words, parallelogram distortion of the frame displayed on the CRT is caused not by the distortion of various video signals such as Hsync, Ihd, and Sv shown in FIG. 31, but by an assembly error of the CRT. Similarly, center-displaced distortion is caused also by an assembling error of the deflection controller. Although arcuate distortion is caused mainly by distortion of a deflection magnetic field or deflection electric field, this is caused not by an electric signal which controls the deflection magnetic field or deflection electric field-but by an assembly accuracy error of the deflection controller, which is the same reason as that for parallelogram distortion.

Conventionally, to correct these horizontal-direction distortions, a method using a centering circuit has been solely used.

FIG. 37 shows a conventional CRT display apparatus equipped with a horizontal distortion correction apparatus using a centering circuit. A CRT display apparatus Ccrt mainly includes a signal separation controller 11, a CRT 24, a horizontal distortion correction apparatus HDC, a centering adjuster 180, and a controller 22.

The signal separation controller 11 separately outputs a video signal Svi, a V pulse Vp for vertical deflection, and an H pulse Hp for horizontal deflection from an input signal Si from a signal source (not shown) such as a computer externally provided. The H pulse Hp is a signal synchronizing with the horizontal synchronizing signal Hsync, which is a start signal of the video signal Svi.

The CRT 24 is connected to the signal separation controller 11, including a video signal controller 12 receiving input of the video signal Svi and a vertical deflection controller 13 receiving input of the V pulse Vp. The video signal controller 12 converts the video signal Svi into the electron beam Eb, emitting the same onto the CRT 24. The vertical deflection controller 13 controls vertical deflection of the above described electron beam Eb based on the V pulse Vp. For this vertical deflection, a method of either magnetic field deflection or electronic field deflection can be taken.

The horizontal distortion correction apparatus HDC is connected to the signals separation controller 11, controlling horizontal deflection of the electron beam Eb based on the H pulse Hp supplied from the signal separation controller 11. Similarly to the vertical deflection controller 13, either method of controlling a magnetic field or an electronic field can be taken. The present invention, which will be described in detail later, relates to a horizontal distortion correction apparatus for correcting horizontal distortion of an image due to an assembly accuracy error of the CRT display apparatus by correcting a video signal. Therefore, also for the conventional art, detailed description of the video signal controller 12 and the vertical deflection controller 13 is omitted herein, and only the horizontal distortion correction apparatus HDC is described herein in detail.

The horizontal distortion correction apparatus HDC is constructed of a PLL circuit 14, a horizontal deflection power source 15, coupling coils 16 and 17, a centering circuit 18, a horizontal drive coil 19, a linearity coil 20, and an S-shaped capacitor 21. The PLL circuit 14 will be described later in detail with reference to FIG. 39.

The PLL circuit 14 is supplied with the H pulse HP, and produces a sawtooth horizontal deflection current Ihd synchronizing therewith. The horizontal deflection power source 15 provides direct-current high voltage through the coupling coil 16 to the drive coil 19 placed thereafter. The horizontal drive coil 19 applies a magnetic field onto the electron beam Eb emitted from the electronic gun 5 to deflect the beam in the horizontal direction. The linearity coil 20 and the S-shaped capacitor 21 are used for correcting deflection of the electron beam Eb.

The centering circuit 18 superposes a direct current Ic on the horizontal deflection current Ihd supplied through the coupling coil 17 from the PLL circuit 14. As a result, the horizontal deflection current Ihd is biased, shifting the raster frame in the horizontal direction to correct the center-displaced distortion. In this sense, the current Ic is herein called a horizontal distortion correction current. The horizontal distortion correction current Ic is adjusted by a user operating the centering circuit 18 through the centering adjuster 180. That is, the user operates the centering adjuster 180 while viewing the frames displayed on the CRT 24 to correct the shift of the video frame Fv.

Next, in FIG. 38, shown is the relation between the horizontal deflection current Ihd and the horizontal distortion correction current Ic at the time of adjusting the shift of the video frame Fv as described above. The horizontal deflection current Ihd is a sawtooth wave having the amplitudes h1 and h2 of the same amount on positive and negative sides centering on 0 A (ampere). The 0 A level of the horizontal deflection current Ihd defines a center O for each scanning line constructing the raster frame Fr. The raster frame Fr defined by such normal horizontal deflection current Ihd being displayed on the CRT having horizontal distortion is shown as a horizontally-distorted raster frame Frh.

As described above, a center Op of the raster frame Frh parallelogram-distorted due to the factors in assembling the CRT is displaced from a center Oc of the cabinet display frame Fc. In the example shown in the drawing, the left part to the center Op of the parallelogram-distorted raster frame Frh of the video frame Fv are viewed more through the cabinet display frame Fc. In other words, the video frame Fv is viewed as shifted to right with respect to the cabinet frame center Oc: the horizontal deflection current Ihd looks as if it is shifted to positive, or the amplitude h1 in positive looks as if it is larger than the amplitude h2 in negative. Such video frame Fv shifted in the horizontal direction is herein called horizontally-distorted video frame Fvh (not shown).

Thus, to cancel out the apparent shift of the horizontal deflection current Ihd, the centering circuit 18 is operated to superpose in the negative direction the DC current horizontal distortion correction current Ic corresponding to the above shift in the horizontal direction. This horizontal distortion correction current Ic corresponds to a negative amplitude hic in the horizontal deflection current Ihd. Therefore, the positive amplitude h1 is reduced by hic to h1', while the negative amplitude h2 is reduced by hic to h2'. As a result, the amplitudes h1' and h2' become |h1'|<|h2'|.

That is, the phase of the horizontal deflection current Ihd is shifted, that is, delayed, in the negative direction for the amount of horizontal distortion correction current Ic. The amplitude of such horizontal deflection current Ihd becomes asymmetric h1' and h2' centering on 0 A. With the raster frame Fr shifted to left with respect to the cabinet display frame Fc, the center-displaced distortion of the parallelogram-distorted video frame Frh is corrected, and the video frame Fv is displayed.

FIG. 39 shows the configuration of the PLL circuit 14. The PLL circuit 14 includes a phase comparator 29, a low pass filter (hereinafter referred to as LPF) 30, a voltage control oscillator (hereinafter referred to as VCO) 31, a 1/N frequency divider 32, a pulse generator 33, and a horizontal output circuit 34. The phase comparator 29 is connected to the signal separation controller 11 of the CRT display apparatus Ccrt for receiving input of the H pulse Hp. The phase comparator 29 is further connected to the horizontal output device 34 for receiving input of a flyback pulse FBP which is a signal indicative of start of the horizontal deflection scanning for each 1H (horizontal synchronizing period).

The phase comparator 29 generates a phase difference signal Sdp corresponding to the phase difference between the supplied H pulse Hp and the flyback pulse FBP. The LPF 30 integrates the phase difference signal Sdp supplied from the phase comparator 29 and converts the same into a phase difference voltage Vdp. The VCO 31 generates an oscillation signal So having a frequency corresponding to the phase difference signal Sdp supplied from the LPF 30.

In the VCO 31, its oscillation frequency OF varies according to input voltage. The VCO 31 is designed to operate with VCO control reference voltage (hereinafter referred to as VCSV) between oscillation maximum input voltage VOmax corresponding to an oscillation maximum frequency FOmax and oscillation minimum input voltage corresponding to an oscillation minimum frequency. The oscillation frequency OF and the oscillation input voltage VO depend on the design of the VCO 31, the characteristics of its components, and the like.

Since having a frequency higher than that of the desired horizontal deflection current Ihd, the oscillation signal So oscillated in the VCO 31 is divided by the 1/N frequency divider 32 into a desired frequency, and a frequency-divided signal Sd is generated. Note that N is the reciprocal of the frequency ratio between the desired frequency and the supplied frequency signal So. Based on the frequency-divided signal Sd having the desired frequency, the pulse generator 33 generates a pulse Pd having a desired duty ratio. Based on this pulse Pd, the horizontal output device 34 generates the horizontal deflection current Ihd, and supplies the same to the horizontal drive coil 19 and others.

The horizontal output device 34 generates the horizontal deflection current Ihd and also the flyback pulse FBP corresponding to the horizontal deflection current Ihd. The flyback pulse FBP is fed-back to the phase comparator 29, and another flyback pulse FBP is again generated based on the H pulse Hp supplied from the signal separation controller 1. This processing is herein called horizontal synchronization processing of one cycle. Based on the flyback pulse FBP generated in the current horizontal synchronization processing, the next horizontal synchronization processing cycle is executed.

FIG. 41 schematically shows the process of the PLL circuit 14 generating the horizontal deflection current Ihd that synchronizes with the H pulse Hp. In the drawing, Dp represents the phase difference between the H pulse Hp supplied to the phase comparator 29 and the flyback pulse FBP corresponding to each H pulse Hp. The phase comparator 29 produces the phase difference signal Sdp corresponding to the phase difference Dp between H pulse Hp and the.flyback pulse FBP. The LPF 30 converts the supplied phase difference signal Sdp into phase difference voltage Vdp.

The phase difference voltage Vdp requires that the VCO 31 further increase its oscillation frequency. The VCO 31 oscillates a higher frequency (with shorter pulse interval) to generate the oscillation signal So. The oscillation signal So is frequency-divided by the 1/N frequency divider 32 so as to have a 1/N frequency, and the frequency-divided signal Sd is generated. Based on the frequency-divided signal Sd, the pulse generator 33 generates the horizontal deflection current Ihd having an appropriate duty ratio, and supplies the same to the horizontal output device 34.

In this way, in the next horizontal synchronization processing cycle, the wavelength of the flyback pulse FBP supplied to the phase comparator 29 is slightly shorter than that of the flyback pulse FBP supplied in the preceding cycle. Accordingly, the phase difference Dp between the flyback pulse FBP and the H pulse Hp is smaller than that in the preceding cycle.

As a result, the phase difference voltage Vdp supplied to the VCO 31 is smaller than that in the preceding cycle. Therefore, an oscillation frequency OF required by the phase difference voltage Vdp to be increased in the VCO 31 is smaller than that in the preceding cycle. Thus, in the end, the flyback pulse FBP synchronizing with the H pulse Hp is produced, and therefore the horizontal deflection current Ihd synchronizing with the H pulse Hp can be obtained.

Described next is a method of correcting parallelogram distortion using the centering circuit 18. That is, the horizontal distortion correction current Ic, which is a large direct current, is gradually superposed on the centering circuit 18 for each line of horizontal scanning, thereby increasing or decreasing the amount of shift in the horizontal direction for each horizontal scanning line. As a result, the raster frame Fr becomes a parallelogram shape.

FIGS. 42, 43, 44, 45, and 46 show the relation between the horizontal deflection current Ihd and the horizontal distortion correction current Ic to make the raster frame Fr into a parallelogram shape. As described with reference to FIG. 38, when the horizontal distortion correction current Ic is superposed on the horizontal deflection current Ihd, as shown in FIG. 42, the position of the raster frame Fr is shifted with respect to the cabinet display frame Fc. As shown in FIG. 43, the raster frame Fr is originally a collection of a plurality of horizontal scanning lines Lhs1 to LhsN (N is an integer arbitrarily determined for each broadcasting system).

Therefore, as shown in FIG. 42, varying the amount of the horizontal distortion correction current Ic, such as Ic1, Ic2, Ic3 . . . , superposed on the horizontal deflection current Ihd which is supplied from the PLL circuit 14 of FIG. 37 for each cycle causes the horizontal scanning line LhsN to gradually shift to the right as N becomes larger and the raster frame Fr is distorted in a parallelogram shape.

If this operation is applied to a raster frame Frb which has been distorted in a parallelogram shape due to factors during assembling as shown in FIG. 44, a raster frame Fr without distortion can be obtained as shown in FIG. 45.

At this time, the output current of the centering circuit 18 takes a sawtooth waveform synchronizing with the period of the V pulse Vp, as shown in FIG. 46.

Arcuate distortion can be corrected using the same principle as that used for correcting parallelogram distortion, with a parabolic wave instead of a sawtooth wave used for correcting parallelogram distortion.

However, since supplying control voltage to the horizontal deflection controller, the centering circuit is at high voltage and large current. To superpose the correction current thereon, components having high withstand voltage are required, resulting in the larger circuit. That leads to increases in size, weight, and further cost of the whole apparatus.

Further, when a plurality of distortions in the horizontal direction simultaneously occur or when a plurality of correction waves are combined for use, the circuit has to be large to control and generate the correction signals at high voltage and large current, also resulting in an increase in size of the whole apparatus.

The present invention is to solve the above problems, providing a small horizontal distortion correction apparatus for controlling a correction signal at low current.

DISCLOSURE OF THE INVENTION

To achieve the above objects, the present invention has the following aspects.

A first aspect of the present invention is directed to a horizontal distortion correction apparatus for correcting horizontal distortion caused by an assemble error of a CRT display apparatus displaying an image by scanning a video signal, based on a horizontal synchronizing signal included in the video signal, comprising:
- a deflector for deflecting an electron beam to display the image on the CRT;
- a deflection controller for controlling a display position of the image by applying a horizontal pulse in synchronization with the horizontal synchronizing signal to the deflector; and
- a residual phase adder for providing a residual phase for the deflection controller to shift a phase of the horizontal pulse in a direction so as to cancel out the horizontal distortion; wherein
  the image scanned in a horizontal direction is displayed without distortion in the horizontal direction.

As described above, in the first aspect, with the use of the residual phase that is originally unavoidable and unremovable, it is possible to more accurately correct horizontal distortion due to low assembling accuracy of the CRT display apparatus.

According to a second aspect, in the first aspect, the deflection controller is constructed by a PLL,
  the residual phase adder is a waveform generator capable of generating a modulated signal having a predetermined waveform, and
  the modulated signal is supplied to the PLL to control the phase of the horizontal pulse.

As described above, in the second aspect, the PLL circuit controlling distortion can realize correction of image distortion in the horizontal direction, thereby downsizing the apparatus.

According to a third aspect, in the second aspect, the modulated signal has a sawtooth waveform, capable of correcting parallelogram distortion of the image.

A fourth aspect is directed to a horizontal distortion correction method for correcting horizontal distortion caused by an assemble error of a CRT display apparatus displaying an image by scanning a video signal, based on a horizontal synchronizing signal included in the video signal, comprising:
- a deflection step of deflecting an electron beam to display an image on the CRT;
- a deflection control step of controlling a display position of the image by applying a horizontal pulse in synchronization with a horizontal synchronizing signal to the deflector; and
- a residual phase addition step of providing a residual phase for the deflection controller to shift a phase of the horizontal pulse in a direction so as to cancel out the horizontal distortion; wherein
  the image scanned in a horizontal direction is displayed without distortion in the horizontal direction.

BEST MODE FOR CARRYING OUT THE INVENTION

The present invention is now described in detail according to the accompanying drawings.

First Embodiment

Figure 1:
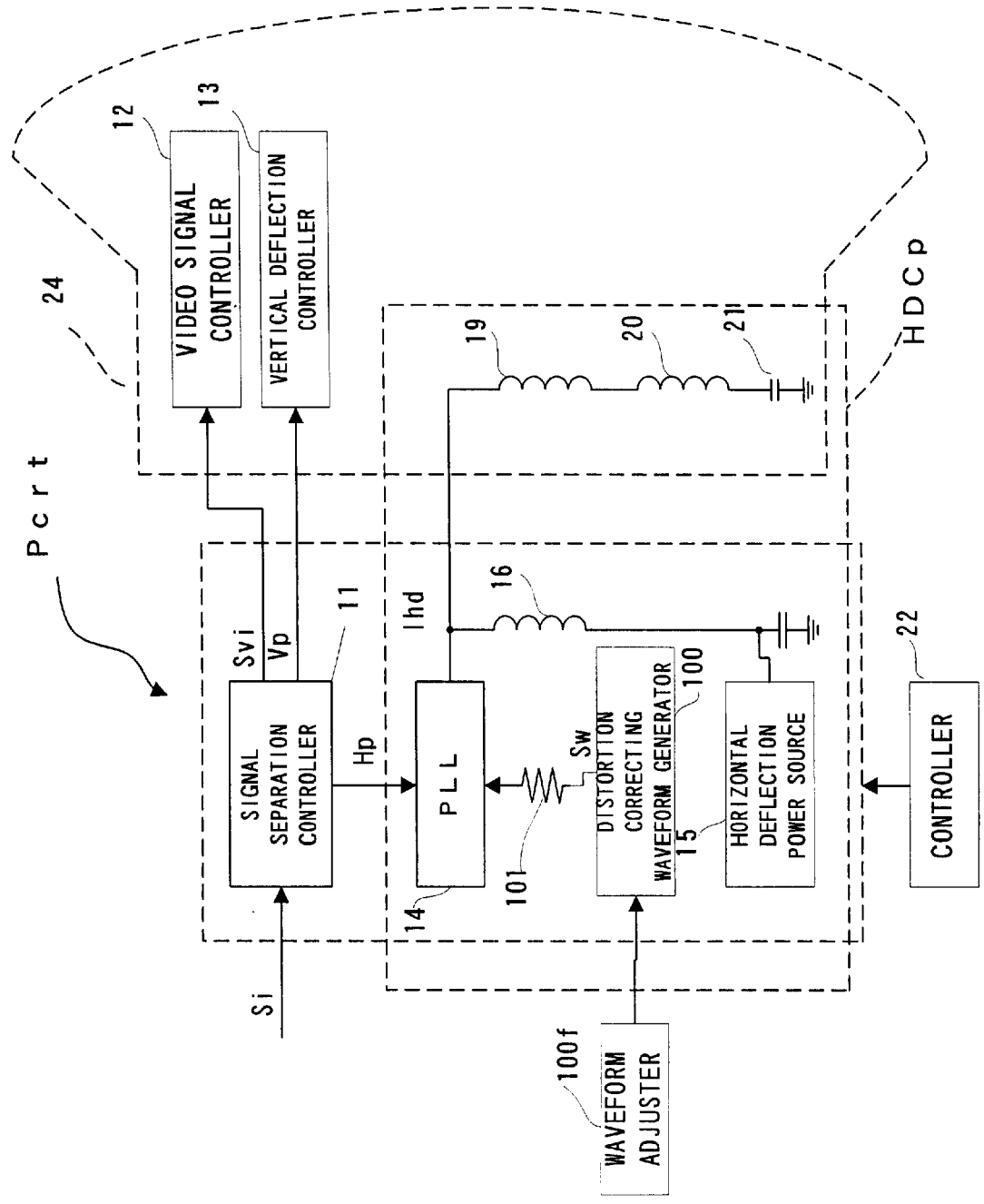
FIG. 1 is a block diagram showing a CRT display apparatus with a horizontal distortion correction apparatus according to a first embodiment of the present invention incorporated therein.

With reference to FIGS. 1, 2, 3, 4, and 5, described below is a horizontal distortion correction apparatus according to a first embodiment of the present invention. FIG. 1 shows a CRT display apparatus Pcrt with a horizontal distortion correction apparatus HDCp according to the present embodiment incorporated therein. The CRT display apparatus Pcrt mainly includes, like the conventional CRT display apparatus Ccrt shown in FIG. 37, a signal separation controller 11, a CRT 24, a horizontal distortion correction apparatus HDCp, a controller 22, and a waveform adjuster 100f.

The CRT 24 includes a video signal controller 12 connected to the signal separation controller 11 for respectively receiving a video signal Svi and a V pulse Vp therefrom. The video signal controller 12 converts the video signal SVi into an electron beam Eb and emits the same onto the CRT. The vertical deflection controller 13 controls vertical deflection of the electron beam Eb based on the V pulse Vp. For vertical deflection, either magnetic field deflection or electronic field deflection can be used.

The horizontal distortion correction apparatus HDCp is connected to the signal separation controller 11 and controls horizontal deflection of the electric beam Eb, based on the H pulse Hp supplied from the signal separation controller 11. Like the vertical deflection controller 13, either magnetic field control or electronic field control can be used.

The horizontal distortion correction apparatus HDCp includes a PLL circuit 14, a horizontal deflection power source 15, a coupling coil 16, a horizontal drive coil 19, a linearity coil 20, an S-shaped capacitor 21, a distortion-correcting waveform generator 100, and a resistor 101. That is, the horizontal distortion correction apparatus HDCp has the same structure as the conventional horizontal distortion correction apparatus HDC except that the centering circuit 18 and the centering adjuster 180 are removed therefrom and the distortion-correcting waveform generator 100 and the resistor 101 are added thereto. The distortion-correcting waveform generator 100 is connected to the waveform adjuster 100f provided outside.

The PLL circuit 14 is supplied with an H pulse Hp, and produces a sawtooth-waveform horizontal deflection current Ihd synchronizing therewith. The horizontal deflection power source 15 supplies DC high voltage through the coupling coil 16 to the drive coil 19 arranged thereafter. The horizontal drive coil 19 applies a magnetic field to the electron beam Eb emitted from the electronic gun 5, and deflects the beam in a horizontal direction. The linearity coil 20 and the S-shaped capacitor 21 are both used for correcting deflection of the electron beam Eb.

Figure 39:
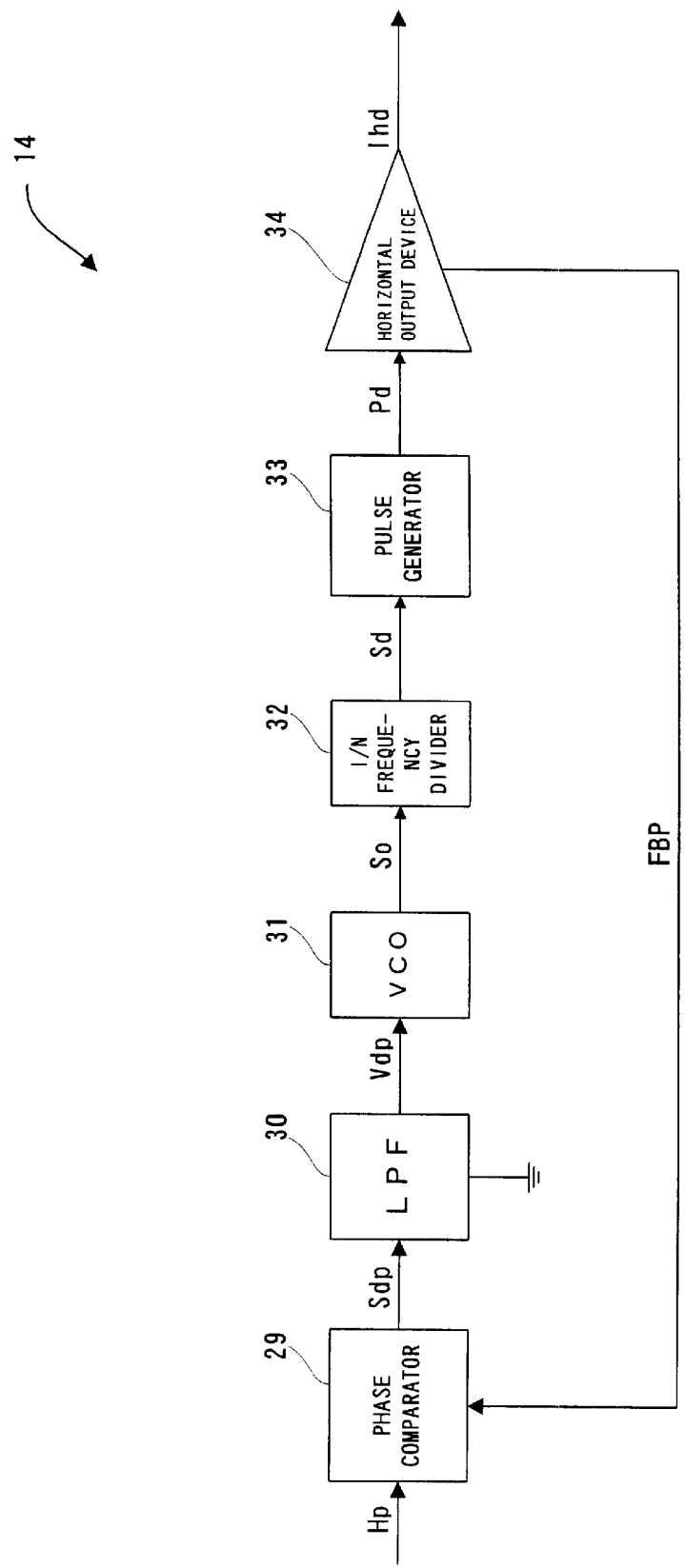
FIG. 39 is a block diagram showing the structure of a PLL circuit for use in an apparatus for correcting horizontal distortion of an image.
Figure 40:
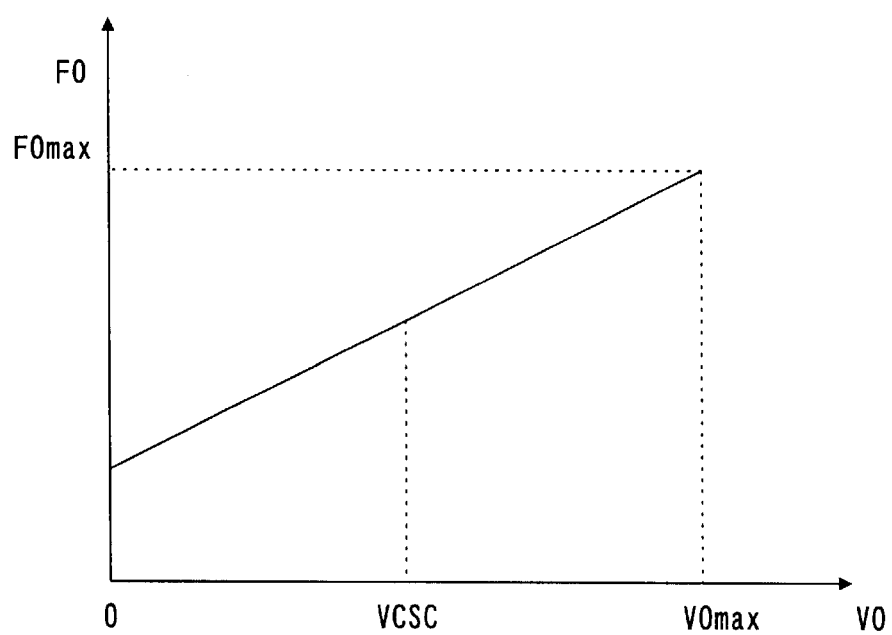
FIG. 40 is a diagram illustrating the relation between input voltage and oscillation frequency in a VCO.

The PLL circuit 14 includes, as shown in FIG. 39, the phase comparator 29, the low pass filter 30, the VCO 31, the 1/N frequency divider 32, the pulse generator 33, and the horizontal output device 34. The phase comparator 29 is connected to the signal separation controller 11 of the CRT display apparatus Pcrt, and is supplied with an H pulse Hp. The phase comparator 29 is further connected to the horizontal output device 34, and is supplied with a flyback pulse FBP which is a signal indicative of start of horizontal deflection scanning for each horizontal synchronization period.

Figure 4:
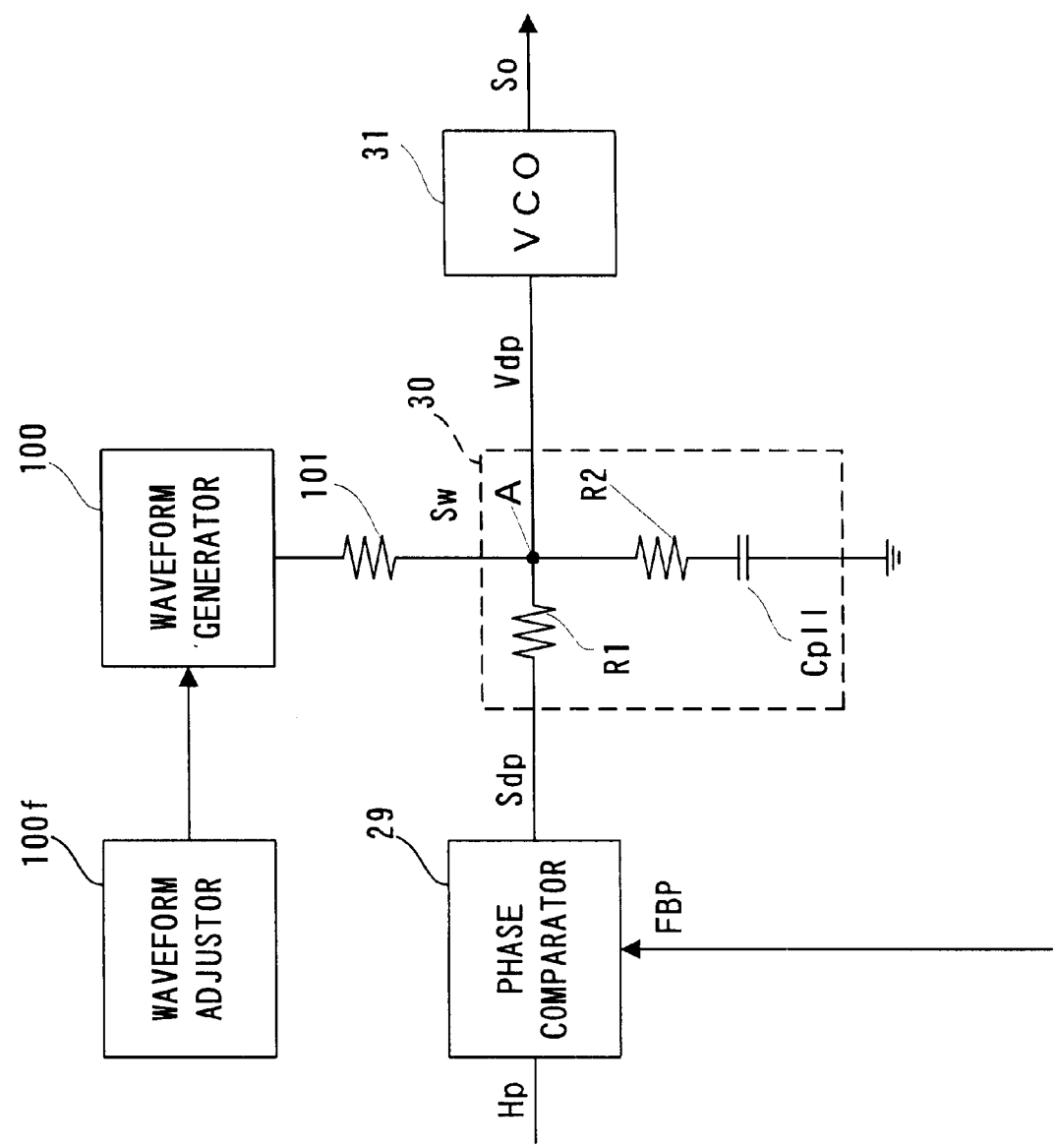
FIG. 4 is a block diagram showing the detailed structure of an LPF 30 of the horizontal distortion correction apparatus shown in FIG. 1.

The phase comparator 29 generates a phase difference signal Sdp according to the phase difference between the supplied H pulse Hp and the flyback pulse FBP. On the other hand, as shown in FIG. 4, the LPF 30 is connected to the distortion-correcting waveform, generator 100 and the waveform adjuster 100f through the resistor 101, with bias voltage applied thereto and therefore with a residual phase intentionally provided thereto. Here, center-displaced distortion is corrected in the stage of an oscillation signal So of the PLL circuit 14, which is performed in the centering circuit 18 in the conventional horizontal distortion correction apparatus HDC.

In other words, with the oscillation signal So of a small current, the horizontal deflection current Ihd of a large current is corrected. Consequently, the components used in the apparatus can be downsized, resulting in reduction in size and weight of the entire apparatus. The correction method with the oscillation signal So using the resistor 101, the distortion-correcting waveform generator 100, and the waveform adjuster 100f will be described later. The LPF 30 subjects the phase difference signal Sdp supplied from the phase comparator 29 to integration processing, and converts the same into DC phase difference voltage Vdp. The VCO 31 generates the oscillation signal So having a frequency according to the phase difference signal Sdp supplied from the LPF 30.

Figure 36:
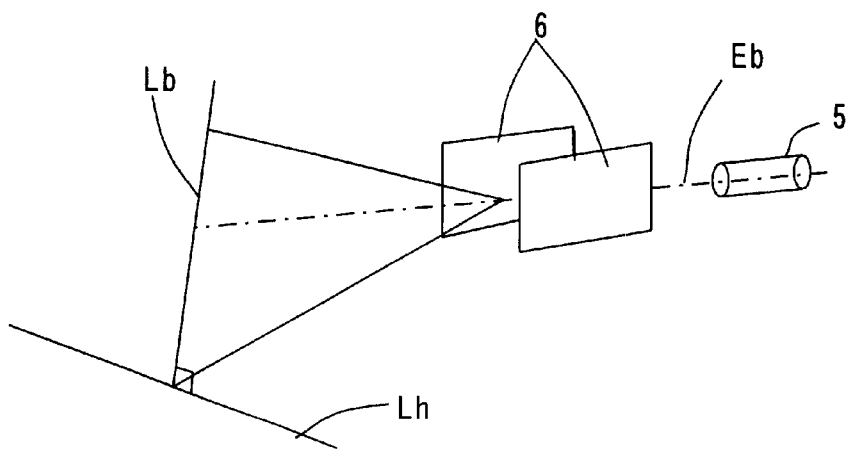
FIG. 36 is a diagram illustrating a display when the electron beam deflector is mounted with displacements onto the CRT display apparatus.

An oscillation frequency FO of the VCO 31 varies according to input voltage. As described with reference to FIG. 36, the VCO 31 is designed to operate at VCO control reference voltage VCSV between the oscillation maximum input voltage VOmax corresponding to the oscillation maximum frequency FOmax and the oscillation minimum input voltage VOmin corresponding to the oscillation minimum frequency. Note that the oscillation frequency and the oscillation input voltage depend on the design of the VCO 31 and materials of the components therein.

Since the oscillation signal So oscillated in the VCO 31 has a high frequency compared with a desired horizontal deflection current Ihd, the 1/N frequency divider 32 divides the frequency of the oscillation signal So into the desired frequency for generating a frequency-divided signal Sd. N is the reciprocal of the ratio of the desired frequency to the frequency of the oscillation signal So.

Based on the frequency-divided signal Sd having the desired frequency, the pulse generator 33 generates a pulse Pd having a desired duty ratio. Based on the pulse Pd, the horizontal output device 34 generates the horizontal deflection current Ihd to supply to the horizontal drive coil 19 and other components. When generating the horizontal deflection current Ihd, the horizontal output device 34 simultaneously generates a flyback pulse FBP corresponding to this horizontal deflection current Ihd.

The process of feeding the flyback pulse FBP back to the phase comparator 29 and the generation of another flyback pulse FBP based on the H pulse Hp supplied from the signal separation controller 11 is herein called horizontal synchronization processing of one cycle. Based on the flyback pulse FBP in the horizontal synchronization processing of the current cycle, next horizontal synchronization processing is executed.

As described above, the horizontal distortion correction apparatus HDCp according to the present embodiment corrects center-displaced distortion, which is performed by the centering circuit 18 in the conventional horizontal distortion correction apparatus HDC, in the stage of output from the PLL circuit 14, by not correcting the horizontal deflection current Ihd of a large current, but driving a large current with a correction signal. This can downsize the components of the apparatus, realizing reduction in size and weight of the entire apparatus.

The PLL circuit 14 is supplied with an H pulse Hp, and is composed of the phase comparator 29, the LPF 30, the VCO 31, the 1/N frequency divider 32, the pulse generator 33, and the horizontal output device 34, which is similar to the PLL circuit 14 as described in FIG. 39. In the present invention, provided are the distortion-correcting waveform generator 100 connected to the LPF 30 of the PLL circuit 14 through the resistor 101, and the waveform adjuster 100f for adjusting the output from the distortion-correcting waveform generator 100. These provisions can cause a residual phase in the PLL circuit 14 and shift the phase of a video signal, thereby allowing correction of center-displaced distortion of the video frame Fv and the raster frame Fr with respect to the cabinet display frame Fc. The operation according to the present invention is now described below.

Figure 2:
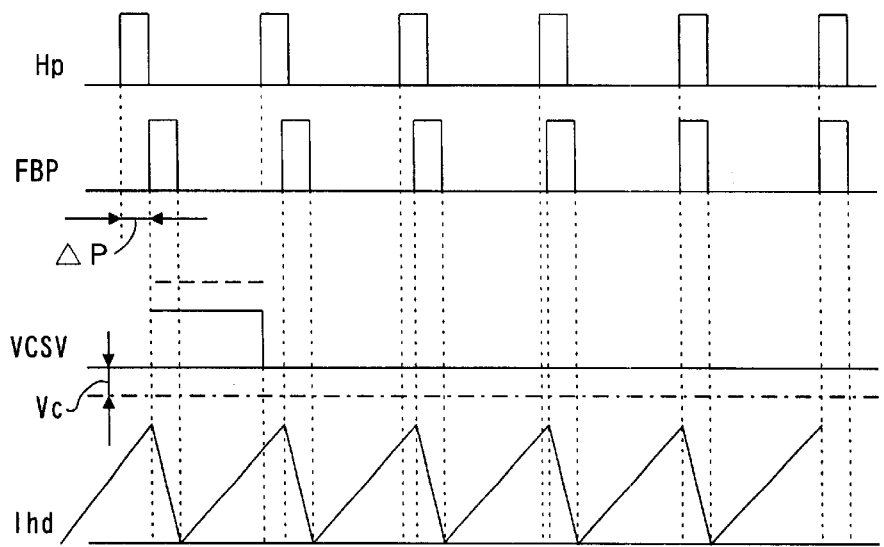
FIG. 2 is a timing chart showing the operation of a horizontal distortion control apparatus shown in FIG. 1.

First, with reference to a timing chart shown in FIG. 2, described is the operation of correcting the phase of a video signal for realizing correction of center-displaced distortion according to the present invention. Also in the present invention, similarly to background art, the PLL circuit 14 is used for obtaining the flyback pulse FBP (that is, horizontal deflection current Ihd) synchronizing with the H pulse Hp. In the present invention, however, the phase difference voltage Vdp, which is input voltage of the VCO 31, is biased in advance for constant voltage Vc.

With the above described synchronizing function, the PLL circuit 14 tries to synchronize with the flyback pulse FBP which is different from the H pulse in phase. Due to the bias of the constant voltage Vc set in the LPF 30, however, the flyback pulse FBP becomes stabilized with its phase shifted from H pulse Hp. The PLL circuit normally operates so as to cancel out the phase difference between the supplied signal (H pulse Hp) and its own output signal (flyback pulse FBP). In the present embodiment, however, the bias voltage Vc is applied to the PLL circuit 14, intentionally causing a phase difference. This phase difference is herein called residual phase, which occurs between the input signal and the output signal even with the PLL circuit 14 being locked.

The horizontal deflection current Ihd corresponding thereto is shifted in phase from the H pulse Hp for a phase difference ΔP for the bias voltage Vc set in the LPF 30 by constant voltage generating means. As described above, the horizontal synchronizing signal Hsync indicative of projection timing of a video signal synchronizes with the H pulse Hp, and therefore a phase shift also occurs between the horizontal deflection current Ihd and the video signal Sv.

Figure 3:
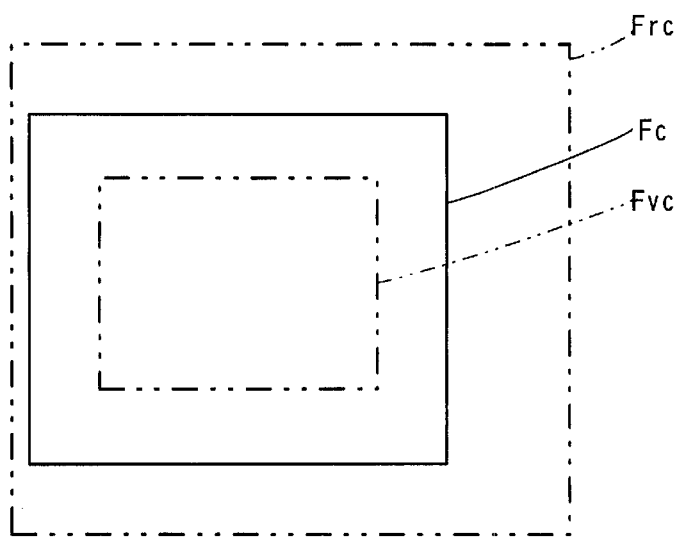
FIG. 3 is a diagram illustrating a frame with its center displaced.

FIG. 3 shows the relation between the raster frame Fr and the cabinet display frame Fc during the above processing. The raster frame Frc and the video frame Fvc with center-displaced distortion are shifted from the cabinet display frame Fc as shown in the drawing. By processing the video signal in such state in the above described manner, the video frame Fvc is shifted in a reverse direction for the phase difference ΔP caused by the bias voltage Vc. As a result, the raster frame Fr and the video frame Fv can be displayed in appropriate positions with respect to the cabinet display frame Fc.

In the present embodiment, for output of the bias voltage Vc from the distortion-correcting waveform generator 100 to the LPF 30, the user operates the waveform adjuster 100f while checking the positional relation between the video frame Fv displayed on the CRT 24 and the cabinet display frame Fc. The structure of the distortion-correcting waveform generator 100 will be described later in detail with reference to FIG. 28.

Figure 37:
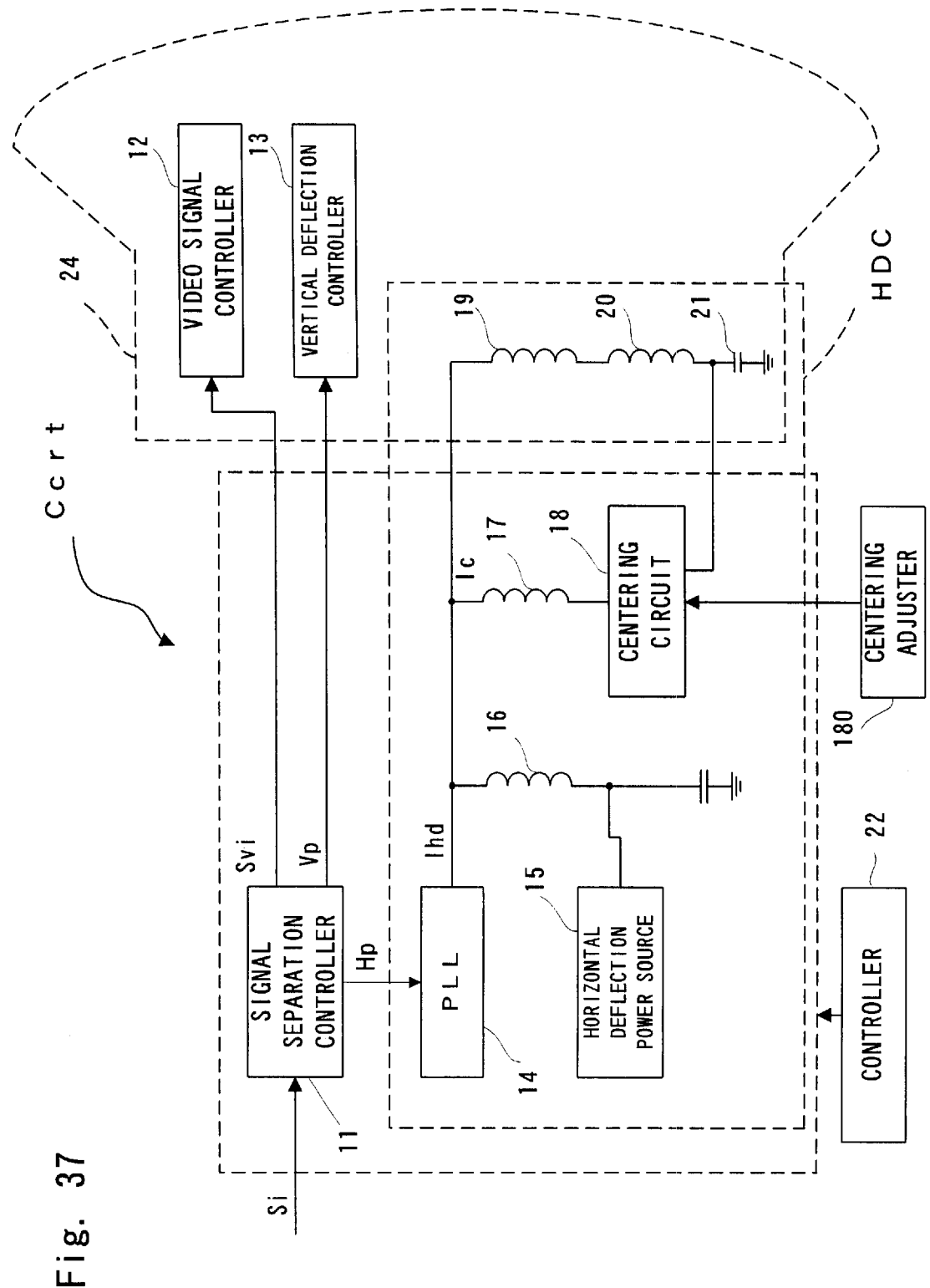
FIG. 37 is a block diagram showing the structure of a CRT display apparatus with a conventional horizontal distortion correction apparatus incorporated therein.
Figure 38:
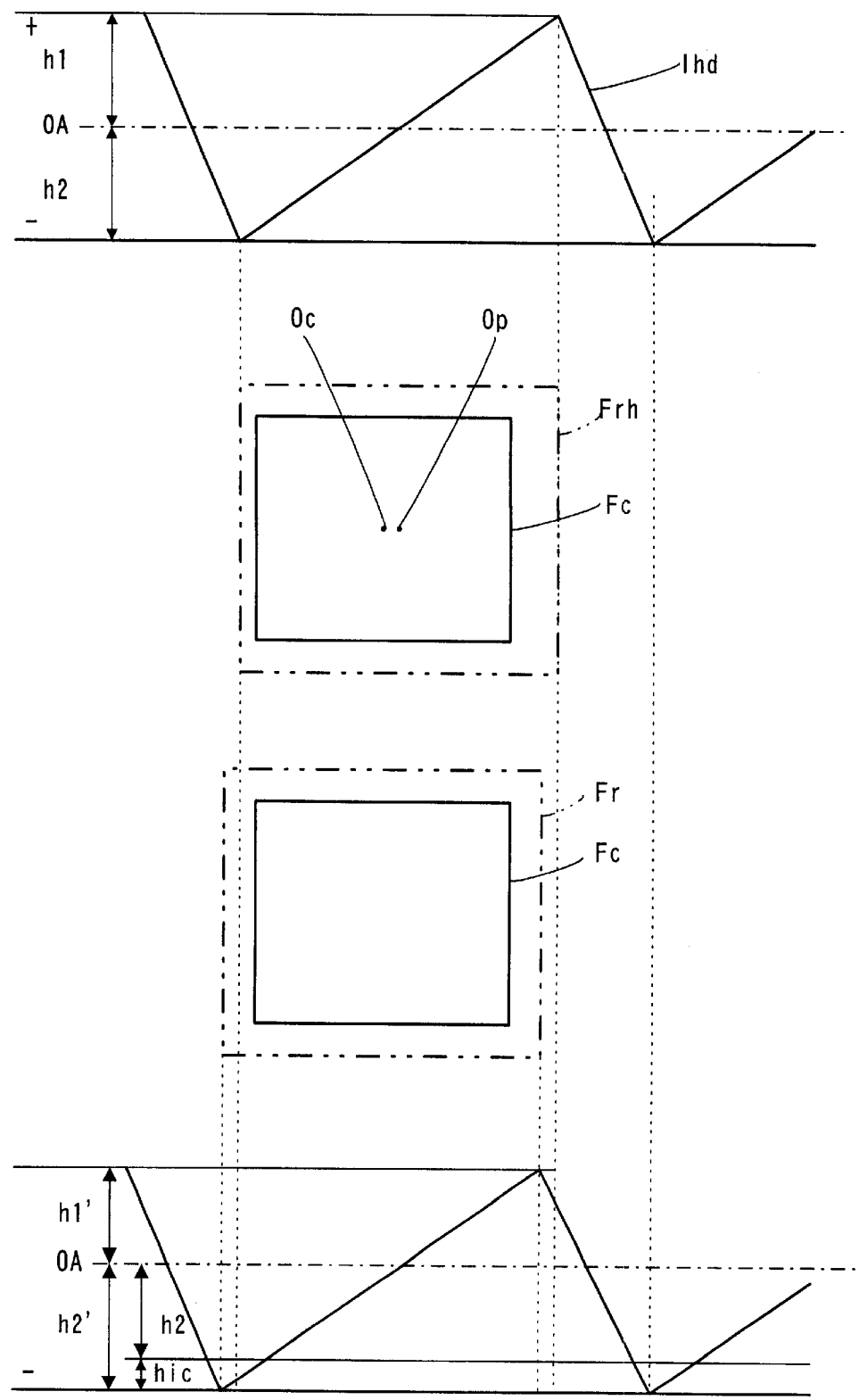
FIG. 38 is a diagram illustrating the relation between the horizontal deflection current and a horizontal distortion correction current during adjustment of the displacement of the video frame.

According to the present invention, the same effects as that according to the background art described with reference to FIG. 37 can be obtained. In the conventional method of correcting center-displaced distortion using the centering circuit 18 shown in FIG. 37, however, center-displaced distortion is corrected by moving the raster frame Fr with respect to the cabinet display frame Fc. On the other hand, the present invention does not change the relation between the raster frame Fr and the cabinet display frame Fc, but changes the phase difference of the video frame Fv from the raster frame Fr using the PLL circuit 14 for driving the horizontal deflection current Ihd.

In other words, one of the characteristics of horizontal distortion correction in the present invention is realized such that center-displaced distortion is corrected by moving the video frame Fv with the raster frame Fr and cabinet display frame Fc fixed. Moreover, the present invention does not require the centering circuit 18 which is conventionally required, reducing the cost and size of the entire apparatus.

Figure 5:
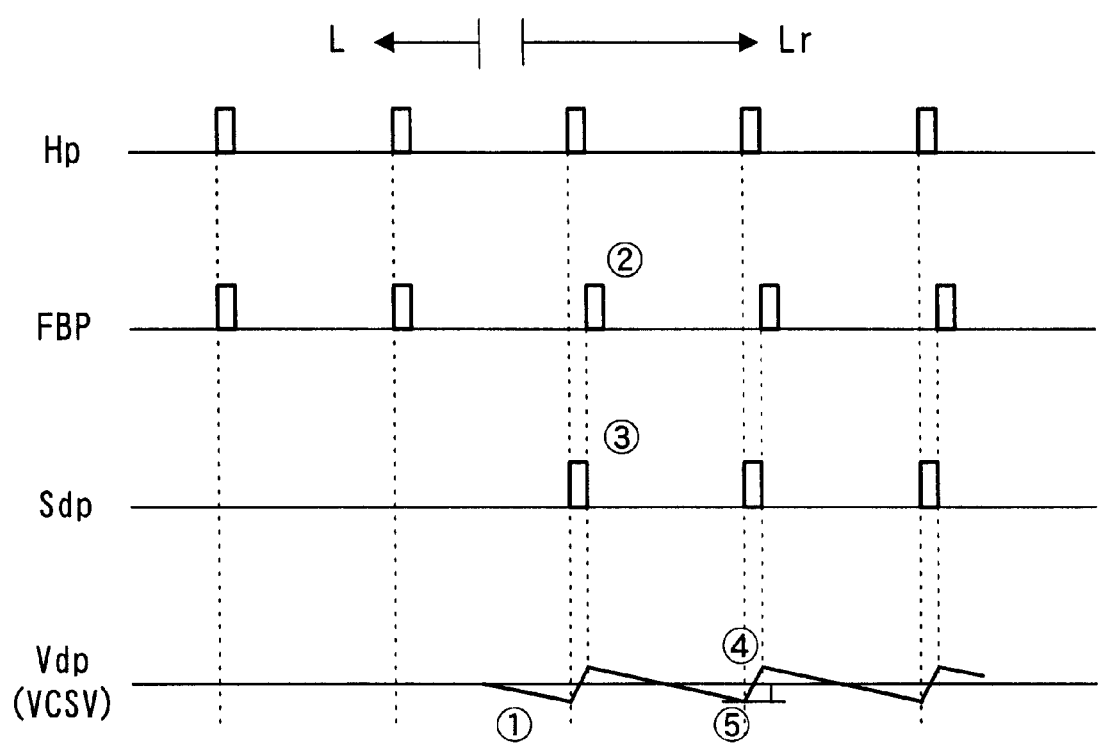
FIG. 5 is a diagram illustrating an input waveform of a VCO.

Further, with reference to FIGS. 4 and 5, the relation between the above described bias voltage Vc and the V pulse Vp is now described. First, as shown in FIG. 4, the LPF 30 includes a resistor R1 serially connected between the phase comparator 29 and the VCO 31. A point A between the VCO 31 and the resistor R1 is an output point of the V pulse Vp to the VCO 31. A resistor R2 and a capacitor Cp11 are serially connected to the output point A. The capacitor Cp11 is grounded. Further, the distortion-correcting waveform generator 100 is connected to the output point A through the resistor 101, as described above.

It has been described that the input waveform of the VCO 31 is made constant in voltage during a period of H pulse Hp. Its actual waveform is now described with FIG. 5. In an H cycle period L shown in the drawing, the H pulse Hp and the flyback pulse FBP are synchronized with each other. Accordingly, the phase difference signal Sdp, which is output from the phase comparator 29, is equal to the VCO control reference voltage VCSV, and therefore constant. In this state, consider a case in which the voltage in the distortion-correcting waveform generator 100 is lower than the VCO control reference voltage VCSV.

The electric charge accumulated in the capacitor Cp11 of LPF 30 is moved to the distortion-correcting waveform generator 100 of lower voltage, gradually decreasing the potential of the phase difference voltage Vdp at the output point A, as indicated by symbol ①. Consequently, the oscillation frequency in the VCO 31 becomes decreased, and the phase of the flyback pulse FBP generated in the horizontal output circuit 34 through the 1/N frequency divider 32 is delayed with respect to the H pulse Hp at the input point of the phase comparator 29, as indicated by symbol ②. As a result, the phase comparator 29 generates, as indicated by symbol ③, a phase difference signal Sdp having constant voltage corresponding to the phase shift between the H pulse Hp and the flyback pulse FBP, and then supplies the same to the LPF 30. During this operation, as indicated by symbol ④, the phase difference voltage Vdp, which is input voltage of the VCO 31, increases.

By repeating this operation, when the distortion-correcting waveform generator 100 is connected to the LPF 30 in order to drive the LPF 30 with voltage lower than the VCO control reference voltage VCSV, the phase difference voltage Vdp becomes a sawtooth wave centering on the VCO control reference voltage VCSV as shown during a period Lr.

Although the bias voltage Vc shown in FIG. 2 actually has a sawtooth waveform as shown in FIG. 5, it is herein described, for convenience purposes, as having constant potential. Note that it is clear from the above that this assumption does not cause contradiction as to the relation between the H pulse Hp and the residual phase, which is distinctive of the present invention.

As described above, in the present embodiment, center-displaced distortion is corrected by biasing with the constant voltage source to leave the residual phase. To achieve this, the PLL is intentionally provided with the residual phase, adjusting the phases between the raster frame Fr and the video signal.

Second Embodiment

Described below is a second embodiment according to the present invention with reference to FIGS. 6, 7, 8, and 9. In the present embodiment, a method for realizing correction of parallelogram distortion using the horizontal distortion correction apparatus HDCp according to the above described first embodiment is described. In the present embodiment, only the different point from correction of center-displaced distortion is the waveform of an output signal Sw applied to the LPF 30 and supplied from the distortion-correcting waveform generator 100.

Figure 6:
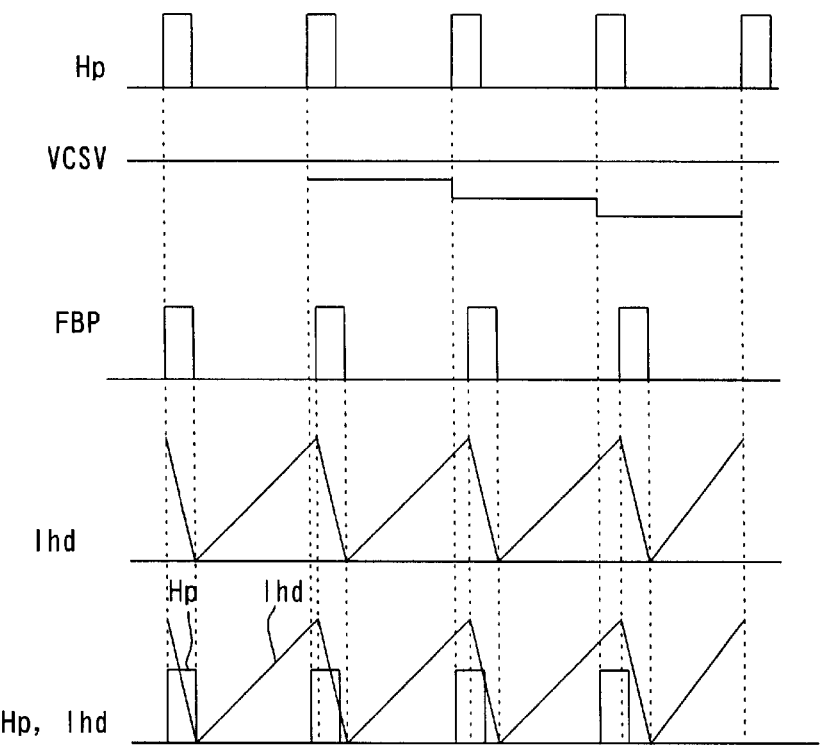
FIG. 6 is a timing chart showing correcting operation to parallelogram distortion by a horizontal distortion correction apparatus according to a second embodiment of the present invention.
Figure 7:
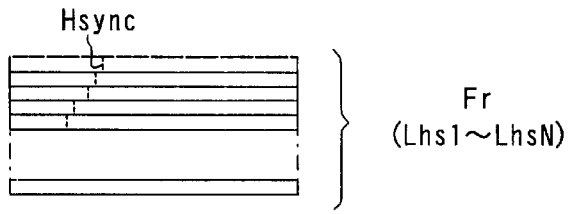
FIG. 7 is a diagram illustrating correcting operation to parallelogram distortion by the horizontal distortion correction apparatus shown in FIG. 6.
Figure 8:
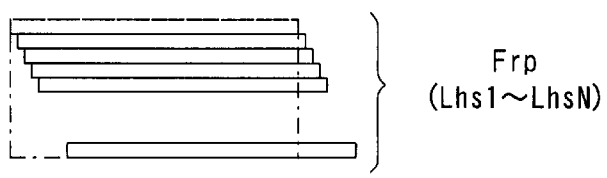
FIG. 8 is a diagram illustrating correcting operation to parallelogram distortion by the horizontal distortion correction apparatus shown in FIG. 6.
Figure 9:
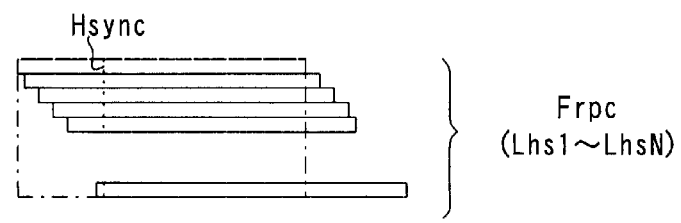
FIG. 9 is a diagram illustrating correcting operation to parallelogram distortion by the horizontal distortion correction apparatus shown in FIG. 6.

Described is correction of parallelogram distortion according to the present embodiment with reference to a timing chart shown in FIG. 6 and the raster frame shown in FIGS. 7, 8, and 9. The distortion-correcting waveform generator 100 causes a phase difference voltage Vdp to be generated, which has a sawtooth waveform gradually increasing with respect to the VCO control reference voltage VCSV of the VCO 31 according to the H pulse Hp. For this phase difference voltage Vdp, the period of the V pulse Vp is taken as one cycle.

This corresponds to the phase difference voltage Vdp (VCSV) enlarged with respect to the input to the VCO 31 in the drawing, which is obtained by superposing the sawtooth wave generated in the distortion-correcting waveform generator 100 and the H pulse Hp in the LPF 30. The sawtooth wave signal Sw is represented as a step wave in the flyback pulse FBP.

As described in the first embodiment, as the input voltage of the VCO 31 is varied, the phases of the horizontal deflection current Ihd and the H pulse Hp become shifted. In other words, as the input voltage (phase difference voltage Vdp) of the VCO 31 is varied as the phase difference voltage Vdp (VCSV), the flyback pulse FBP is shifted from the H pulse Hp in phase, meaning that a phase shift of the horizontal deflection current Ihd occurs in relation to the H pulse Hp. At the bottom of FIG. 6, simultaneously shown are the H pulse Hp and the horizontal deflection current Ihd to clarify the relation therebetween.

With reference to FIGS. 7, 8, and 9, the relation between the horizontal scanning lines Lhs1 to LhsN and the horizontal deflection current Ihd in the above processing is now described. For the relation between the horizontal scanning lines Lhs1 to LhsN and the horizontal synchronizing signal Hsync defining a starting point of video, as shown in FIG. 7, the point of the horizontal synchronizing signal Hsync become shifted with respect to horizontal scanning lines Lhs1 to LhsN. FIG. 9 shows a state when such video signal is displayed on the CRT display apparatus having parallelogram distortion as shown in FIG. 8. That is, the horizontal synchronizing signals Hsync of the scanning lines aligns vertically in the raster frame Frpc, thereby correcting the parallelogram distortion with respect to the cabinet display frame Fc (not shown).

In this way, in the present embodiment, the distortion-correcting waveform generator 100 generates the sawtooth wave signal Sw, which is supplied to the PLL circuit 14 in order to modulate the phase difference voltage Vdp, which is an output from the LPF 30, thereby correcting parallelogram distortion. The amplitude of the sawtooth wave (Sw) generated by the distortion-correcting waveform generator 100 is adjusted by the user operating the waveform adjuster 100f as checking the shift of the frames on the CRT display apparatus. Furthermore, in the present embodiment, parallelogram distortion is corrected with reference to the upper end of the frame. In this case, the bias is divided into positive and negative sides of the VCO control reference voltage VCSV, thereby setting the correction reference point to a desired position. In this case, the "reference" means a point where the H pulse Hp and the flyback pulse FBP are not shifted after horizontal distortion correction.

Third Embodiment

With reference to FIGS. 10, 11, 12, 13, 14, 15, 16, 17, 18, and 19, a third embodiment of the present invention is now described. In the above described second embodiment, parallelogram distortion is corrected by superposing the sawtooth wave signal Sw on the LPF 30 of the PLL circuit 14. The state of the relation of the residual phase with input of the VCO 31 in the PLL circuit is often as such shown in FIG. 10.

Figure 10:
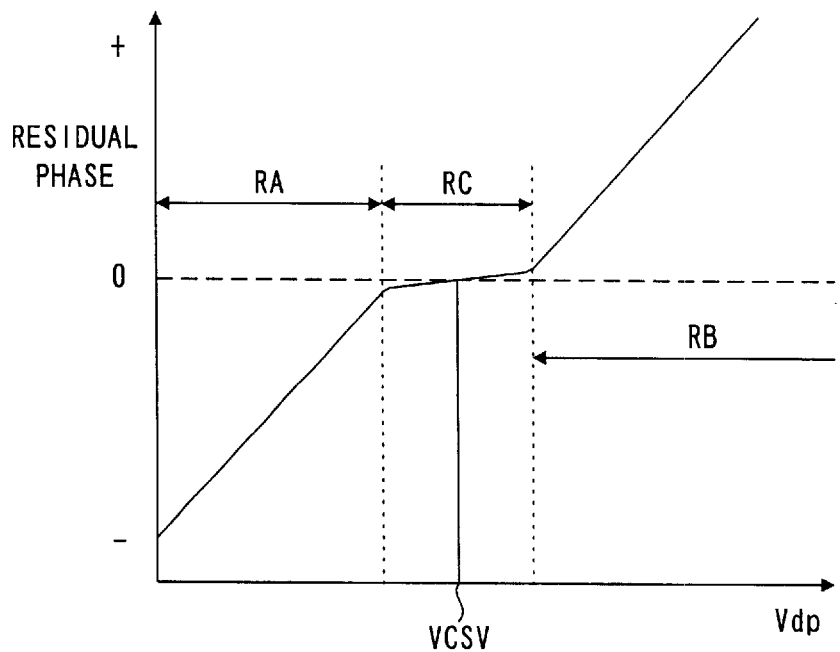
FIG. 10 is a diagram illustrating the relation between a residual phase and phase difference voltage Vdp in the VCO.
Figure 11:
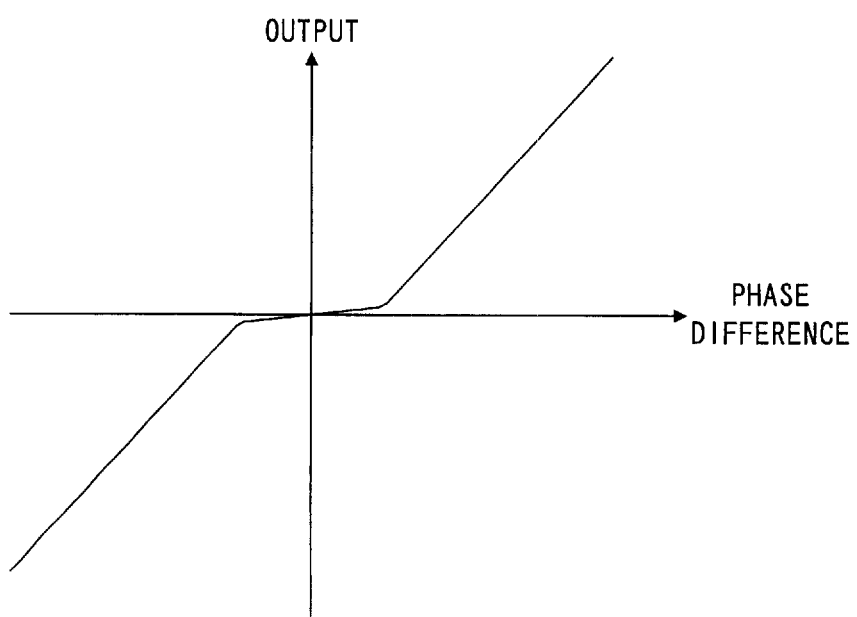
FIG. 11 is a diagram showing characteristics of output with respect to a phase difference of signal supplied to a phase comparator in a PLL circuit.
Figure 41:
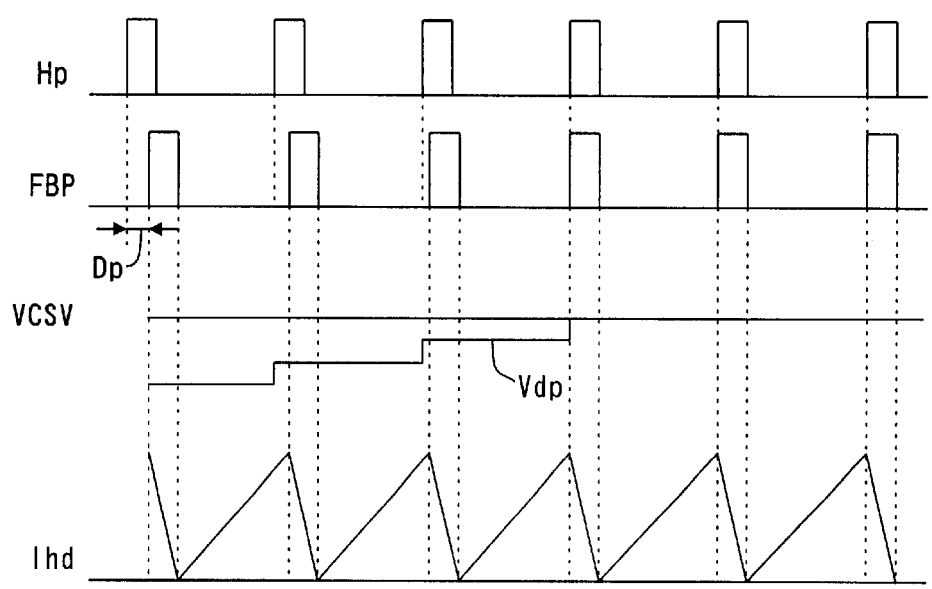
FIG. 41 is a timing chart schematically showing the process of generating a horizontal deflection current in synchronization with the H pulse Hp by the PLL circuit.
Figure 42:
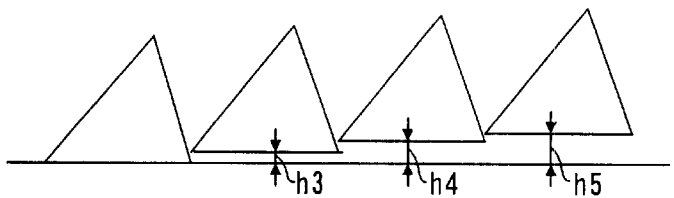
FIG. 42 is a diagram illustrating that the position of the raster frame is shifted with respected to a cabinet display frame Fc when the horizontal distortion correction current is superposed on the horizontal deflection current.
Figure 43:
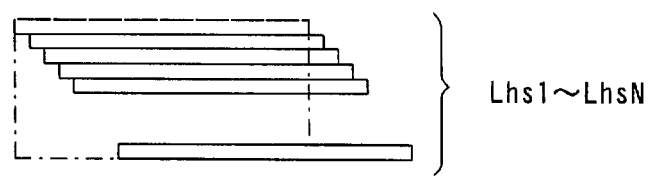
FIG. 43 is a diagram illustrating the relation between the raster frame distorted in a parallelogram shape due to factors in assembling the CRT display apparatus and horizontal scanning lines.
Figure 44:
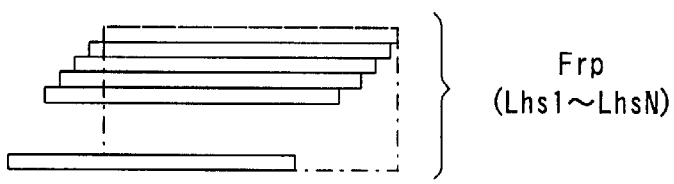
FIG. 44 is a diagram illustrating the relation between the raster frame and the horizontal scanning lines during horizontal distortion correction by the horizontal distortion correction shown in FIG. 37.
Figure 45:
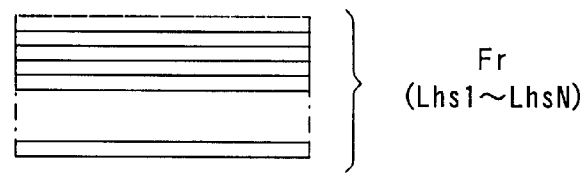
FIG. 45 is a diagram illustrating the relation between the raster frame and the horizontal scanning lines during horizontal distortion correction by the horizontal distortion correction shown in FIG. 37.
Figure 46:
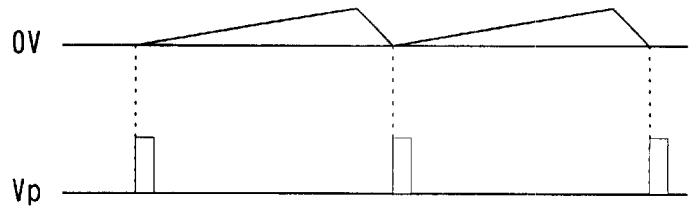
FIG. 46 is a diagram illustrating the relation between an output current of a centering circuit and a V pulse during horizontal distortion correction shown in FIG. 37.

In FIG. 10, in the vicinity of the VCO control reference voltage VCSV of the VCO 31, the residual distortion occurs nonlinearly (RC). This is because the output characteristics of the phase comparator 29 in the PLL circuit with respect to the supplied phase difference is such as shown in FIG. 11. In other words, as described above with reference to FIG. 41, the output of the phase comparator 29 becomes 0 even though the supplied H pulse Hp and the flyback pulse FBP are not matched in phase. Therefore, even though the H pulse Hp, which is an input signal, does not completely synchronizes with the FBP, which is an output signal, the PLL circuit 14 becomes locked.

Such nonlinear characteristic part varies according to, for example, design specifications such as differences in manufactures of the PLL circuit 14, available frequencies, and components in use. This nonlinear part may sometime be negligible and sometime significant. In some cases, such part becomes too significant to be negligible especially when cheap components and ICs are used therein for reduction in cost, preventing uniform vertical correction of parallelogram in the raster also in the second embodiment.

Figure 12:
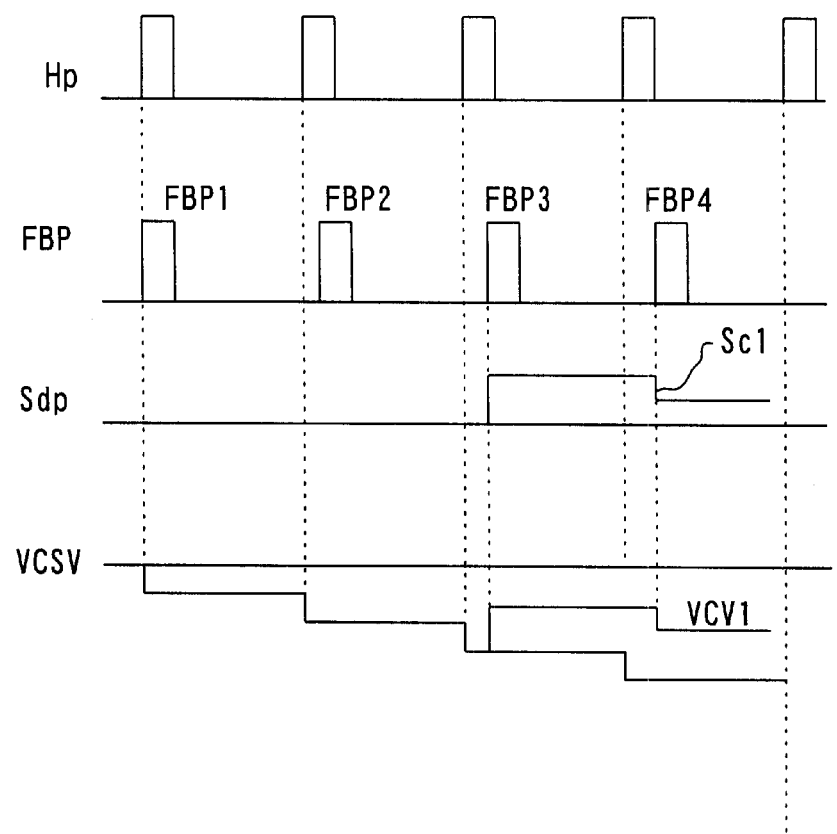
FIG. 12 is a timing chart showing the operation of a horizontal distortion correction apparatus according to a third embodiment of the present invention.

With reference to a timing chart shown in FIG. 12, the operation of each signal in this case is now described. As shown in the drawing, the H pulse Hp is provided with a correction wave (wave signal Sw) from the distortion-correcting waveform generator 100. This causes a shift in phase between the H pulse Hp and the FBP. In parts from FBP1 to FBP2, however, the phase comparator 29 cannot judge that the supplied H pulse Hp and the FBP are shifted in phase, and the phase difference signal Sdp supplied from the phase comparator remains 0. When the phase difference exceeds a certain value, however, the phase comparator 29 determines that the phase difference occurs, and produces a signal Sc1 for correction. This changes the input voltage to the VCO 31 to VCV1, preventing smooth change in the phase of the FBP.

Figure 13:
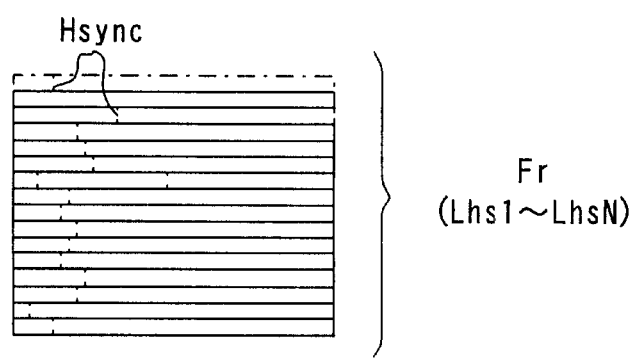
FIG. 13 is a diagram illustrating the relation between a raster frame and horizontal scanning lines during the operation shown in FIG. 12.

As shown in FIG. 13, for the relation between the horizontal scanning lines Lhs1 to LhsHN and the horizontal synchronizing signal Hsync indicative of a starting position of the video signal Sv, the starting position of the video signal Sv varies unsmoothly in step-like shape, although, as shown in FIG. 7, the position should vary linearly and diagonally from the upper part of the raster frame Fr to the low part thereof with respect to the horizontal line of the raster frame Fr.

Even in such case, the present embodiment can effectively correct horizontal distortion. The configuration of the CRT display apparatus in the present embodiment is the same as that in the second embodiment except the waveform of the wave signal Sw generated by the distortion-correcting waveform generator 100.

Figure 14:
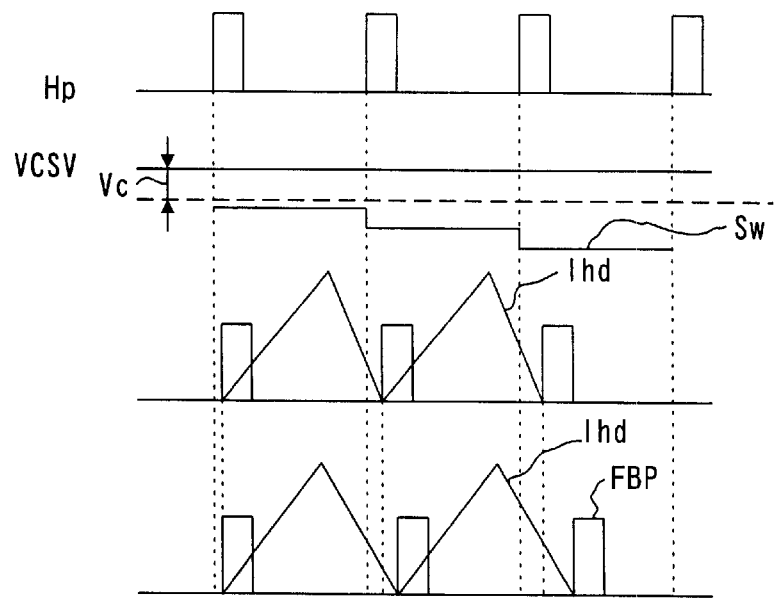
FIG. 14 is a diagram illustrating a waveform of a wave signal in the horizontal distortion correction apparatus shown in FIG. 12.

With reference to FIG. 14, the waveform of the wave signal Sw in the present embodiment is now described. In the present embodiment, the constant voltage according to the first embodiment and the correction waveform (wave signal Sw) with the sawtooth waveform superposed thereon according to the second embodiment are generated from the distortion-correcting waveform generator 100. The effect of the constant voltage is the same as that in the first embodiment, causing a certain phase shift between the H pulse Hp and the horizontal deflection current Ihd.

Figure 15:
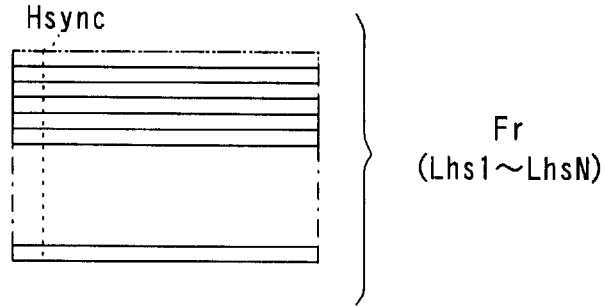
FIG. 15 is a diagram illustrating the relation between the raster frame and horizontal scanning lines during the operation shown in FIG. 14.
Figure 16:
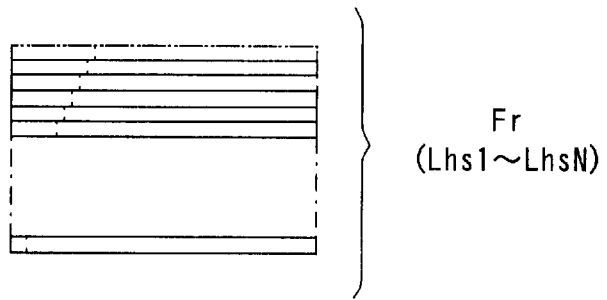
FIG. 16 is a diagram illustrating the relation between the raster frame and the horizontal scanning lines during the operation shown in FIG. 14.

FIG. 15 shows the relation between the horizontal scanning lines Lhs1 to LhsN and the horizontal synchronizing signal Hsync in such case. The effect of the sawtooth wave (wave signal Sw) is the same as that in the second embodiment, causing a phase shift of the video frame Fv for each horizontal scanning line with respect to the raster frame Fr. Combining these shifts enables correction of parallelogram distortion as shown in FIG. 16.

That is, as shown in FIG. 14, when a certain bias component (Vc) with a sawtooth wave (wave signal Sw) superposed thereon is supplied to the VCO 31 as a correction wave, the H pulse Hp and the FBP are always different in phase for the bias voltage Vc. Therefore, the phase comparator 29 always produces an output corresponding to the phase difference. The bottom of FIG. 14 shows the horizontal deflection current Ihd supplied to the H pulse Hp with the FBP generated thereby superposed thereon.

In view of above described FIG. 10 showing the relation between the VCO 31 and the residual phase, with the constant voltage as a bias, the PLL circuit 14 is operated in a region RA or RB away from the vicinity of the VCSV. In other words, correction of parallelogram distortion is made not using a region RC of no linearity in the vicinity of VCSV, but using parts of the linear relation between the input voltage (Vdp) of the VCO 31 and the residual phase, that is, the region RA or RB. With this, uniform correction of parallelogram distortion can be made even with a nonlinear region in which the phase difference between the H pulse Hp and the FBP cannot be detected as described with reference to FIG. 12.

Furthermore, although the sawtooth wave in the present embodiment is exemplarily shown in the region RA lower than VCSV shown in FIG. 10, the same effect can be also obtained in the region RB above VCSV. Still further, also in the second and present embodiments, the correction wave (wave signal Sw) may be a parabolic signal, capable of correction of arcuate distortion.

Figure 17:
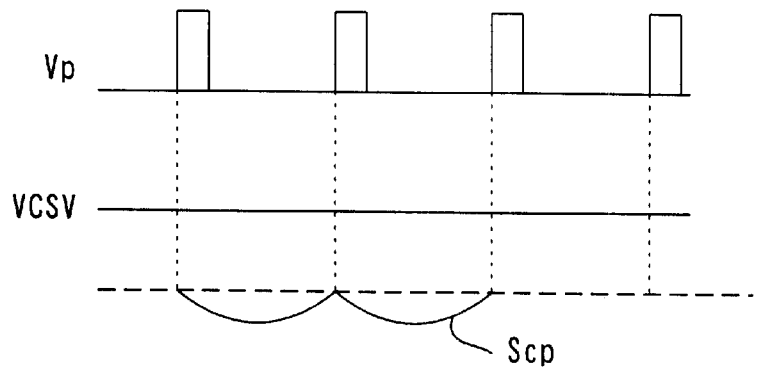
FIG. 17 is a diagram illustrating a method of correcting an arcuate distortion by the horizontal distortion correction apparatus.
Figure 18:
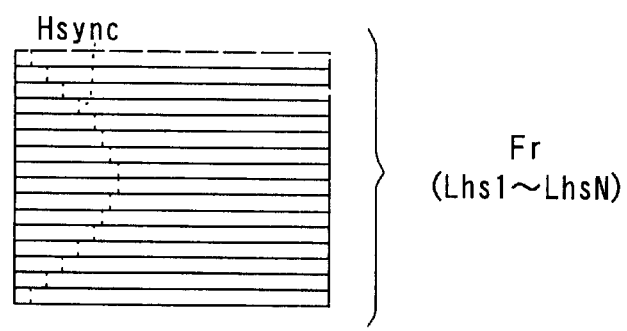
FIG. 18 is a diagram illustrating the relation between the raster frame and horizontal scanning lines during the operation shown in FIG. 17.
Figure 19:
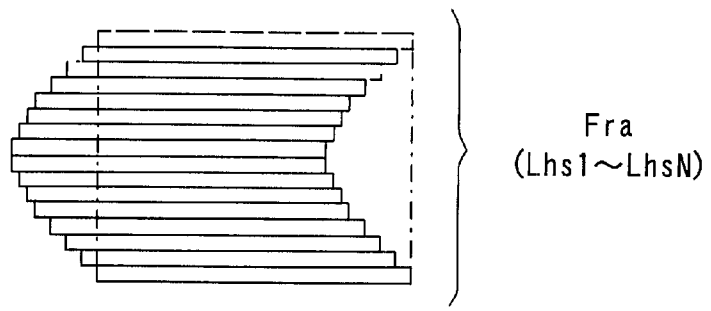
FIG. 19 is a diagram illustrating the relation between the raster frame and the horizontal scanning lines during the operation shown in FIG. 17.

With reference to FIGS. 17, 18, and 19, a method of correcting arcuate distortion in the present embodiment is now described. Shown below the VCO control reference voltage VCSV is a parabolic correction wave Scp. Such correction wave Scp has a period of the V pulse Vp. In this case, with raster having no arcuate distortion, the relation between the scanning lines Lhs1 to LhsN and the horizontal synchronizing signal Hsyn is shown in FIG. 18. Applying such video signal to the raster frame Fra distorted as such in FIG. 19 enables video to be displayed without distortion.

As described above, in the present embodiment, the LPF 30 is biased, and further, the linear parts of the regions RA and RB of the phase comparator 29 are used. In this case, a shift in the horizontal direction also occurs simultaneously. Moreover, the H pulse Hp can be independently adjustable in phase.

Fourth Embodiment

Figure 20:
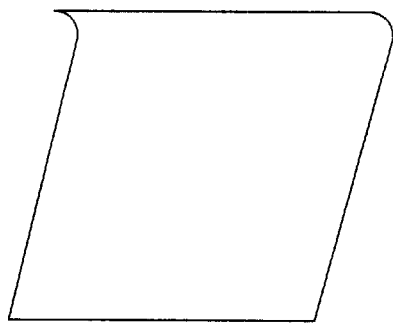
FIG. 20 is a diagram illustrating an example of horizontal distortion to be corrected by a horizontal distortion correction apparatus according to a fourth embodiment of the present invention.

With reference to FIGS. 20, 21, 22, 23, 24, and 25, a fourth embodiment of the present invention is described below. In the present invention, the horizontal distortion correction apparatus HDCp can correct horizontal distortion, as described in the second and third embodiments. As the amount of correction increases, however, the upper end portion of the video signal Sv may be distorted, as shown in FIG. 20.

In other words, when the signal with its parallelogram distortion corrected is displayed on the CRT without no parallelogram distortion, the frame is distorted in a parallelogram shape in reverse to the distortion. In a case which will be described in the present embodiment, the PLL circuit 14 cannot synchronize with the horizontal scanning timing, and therefore the upper end of the video frame Fv is distorted. This is mainly because the VCO 31 is delayed in time with respect to the input voltage Vdp for supplying a predetermined frequency. This time delay depends on a loop gain of the PLL circuit 14 such as the control sensitivity of the VCO 31, the quality of the components, the supplied voltage, and the like.

Figure 21:
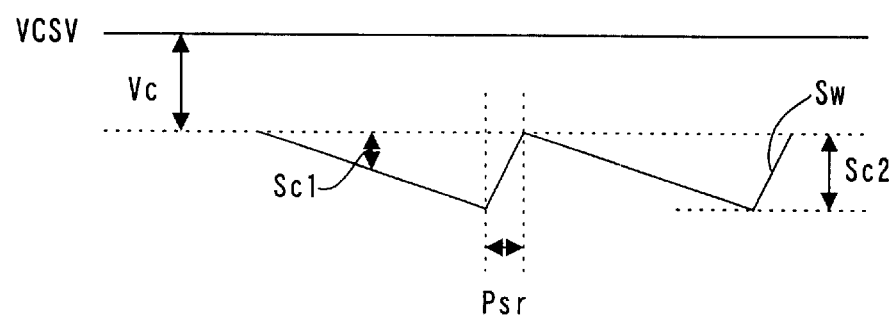
FIG. 21 is a diagram illustrating bias voltage Vc superposed onto VCO control reference voltage for correcting horizontal distortion shown in FIG. 20.
Figure 22:
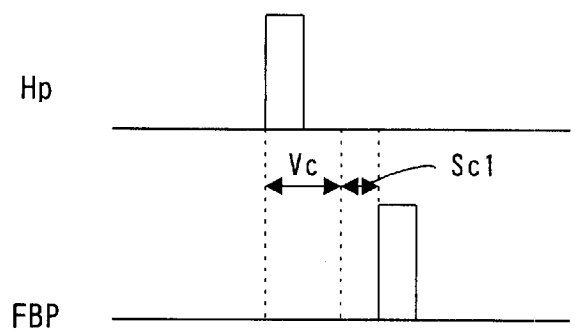
FIG. 22 is a diagram illustrating the relation between an H pulse and a flyback pulse FBP during correction of horizontal distortion shown in FIG. 20.
Figure 23:
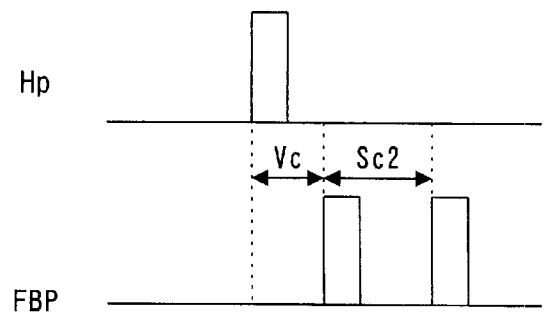
FIG. 23 is a diagram illustrating the relation between an H pulse and a flyback pulse FBP during correction of the horizontal distortion shown in FIG. 20.

Such case is now described with reference to FIGS. 21, 22, 23, and 24. FIG. 21 shows a sawtooth correction waveform (wave signal Sw) is superposed on the bias voltage Vc with respect to the VCO control reference voltage VCSV. FIGS. 22 and 23 show the H pulse Hp and the flyback pulse FBP. As shown in FIG. 22, the flyback pulse FBP is shifted from the H pulse Hp for the bias and the correction signal Sc1 on the upper part of the video frame Fv. On the other hand, on the lower part of the video frame Fv, as shown in FIG. 23, the flyback pulse FBP is shifted from the H pulse Hp for the bias voltage Vc and the correction signal Sc2.

Figure 24:
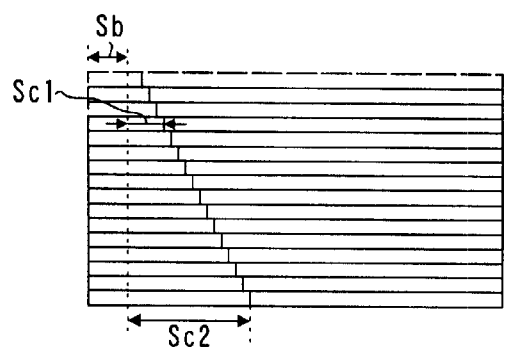
FIG. 24 is a diagram illustrating the relation between a raster frame Fr and a horizontal synchronizing signal Hsync during correction of the horizontal distortion shown in FIG. 20.

FIG. 24 shows the relation between the raster frame Fr and the horizontal synchronizing signal Hsync in the above described case. The shift of the flyback pulse FBP from the H pulse Hp has to be recovered to the phase of the bias voltage Vc in sawtooth wave period (corresponding to the vertical blanking period in the raster frame Fr) of a short period of time. At this time, the PLL circuit 14 tries to decrease the phase difference between the H pulse Hp and the FBP for each H pulse Hp. Therefore, based on the phase to which the phase difference is to be recovered and the response rate of the PLL circuit 14 with respect to the number of H pulses Hp supplied, the state of the phase difference between the flyback pulse FBP and the H pulse Hp is determined after sawtooth feedback period ends.

The state shown in FIG. 20 occurs because the flyback pulse FBP has not yet been recovered even after the feedback period of the sawtooth wave (wave signal Sw). In this case, therefore, the correction wave (wave signal Sw) having merely a sawtooth waveform cannot sufficiently correct distortion. Thus, another method has to be taken for the correction wave. The present embodiment provides a correction wave in such case.

Figure 25:
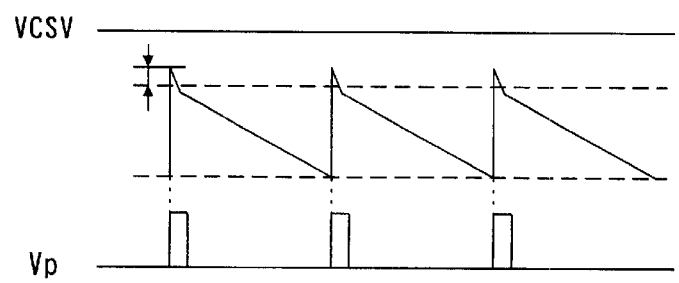
FIG. 25 is a diagram illustrating the form of a correction wave for use in the third embodiment of the present invention.

With reference to FIG. 25, the form of the correction wave (wave signal Sw) for use in the present embodiment is now described. In the present embodiment, an additional waveform for correcting the upper end part of the raster frame Fr is superposed on the sawtooth wave (wave signal Sw) used in the above second and third embodiments. When the FBP is not sufficiently recovered as described above, this additional waveform transiently varies the phase to compensate the delay.

Figure 26:
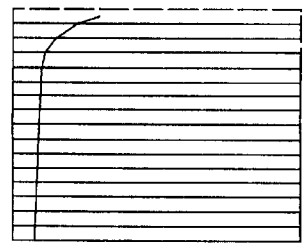
FIG. 26 is a diagram illustrating a state of the raster frame and the video frame when the correction wave shown in FIG. 25 is used for an ideal PLL circuit supporting any correction wave.

As shown in FIG. 25, the sawtooth correction wave (wave signal Sw) with the additional waveform added thereto is added to the vertical deflection period defined by the V pulse Vp. FIG. 26 shows the state of the raster frame Fr and the video frame Fv when this correction wave is used for the ideal PLL circuit 14 that can support any correction wave. In order to cope with a large phase shift on the upper end part of the frame, such correction wave is supplied to the horizontal deflection control circuit HDCp including the PLL circuit 14 with the characteristics as shown in FIG. 20, thereby allowing uniform correction of parallelogram distortion, as described with reference to FIGS. 7, 8, and 9.

Note that the present embodiment can be applied only to parallelogram distortion out of horizontal distortions, and is not be used for center-displaced distortion or arcuate distortion. This is because, in such distortions, the phase does not have to be converged in the vertical blanking period since the scanning lines and the horizontal synchronizing signal Hsyn are the same in phase on the upper and lower parts of the frame.

Fifth Embodiment

Figure 27:
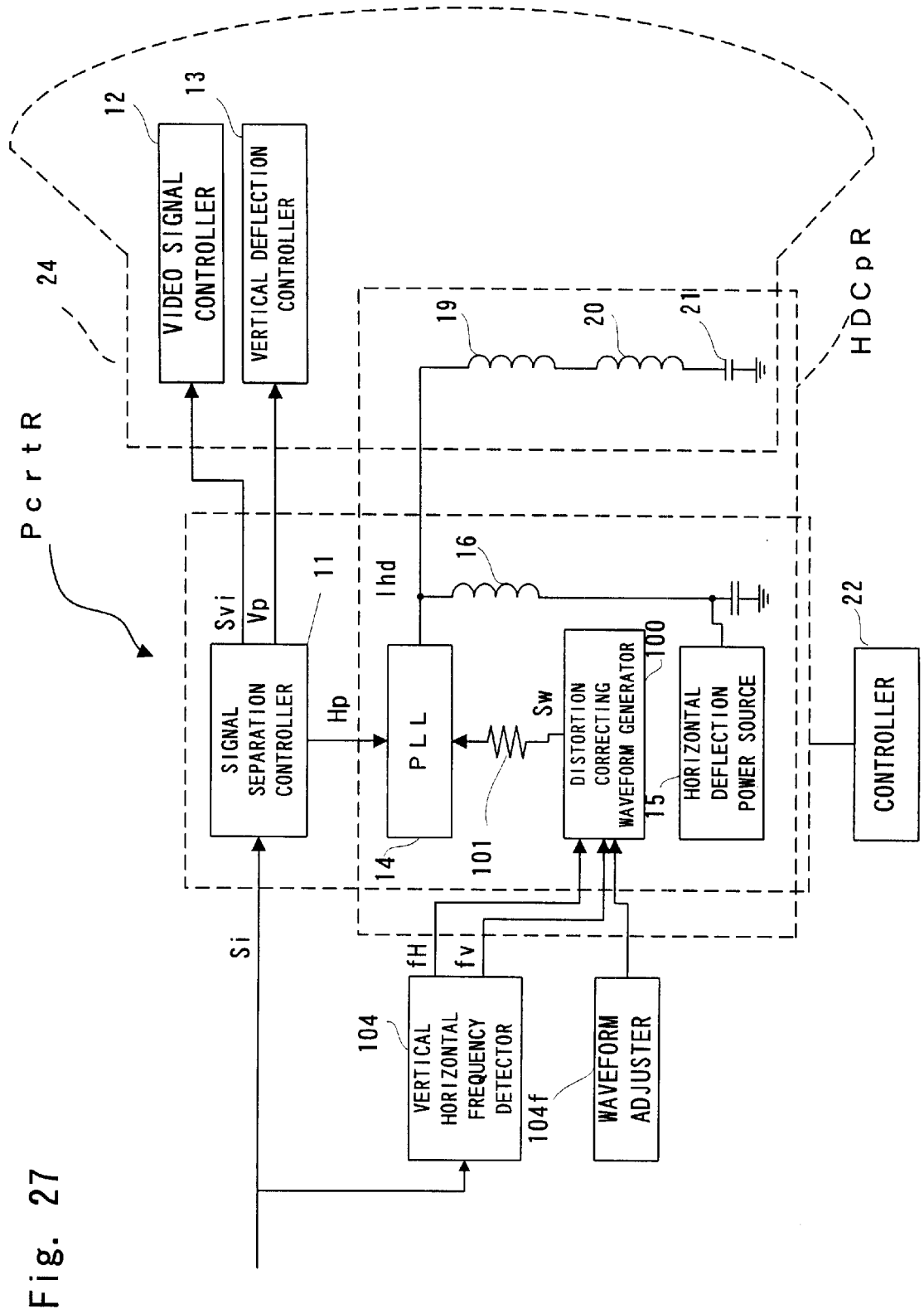
FIG. 27 is a block diagram showing a CRT display apparatus with a horizontal distortion correction apparatus according to a fifth embodiment of the present invention incorporated therein.
Figure 28:
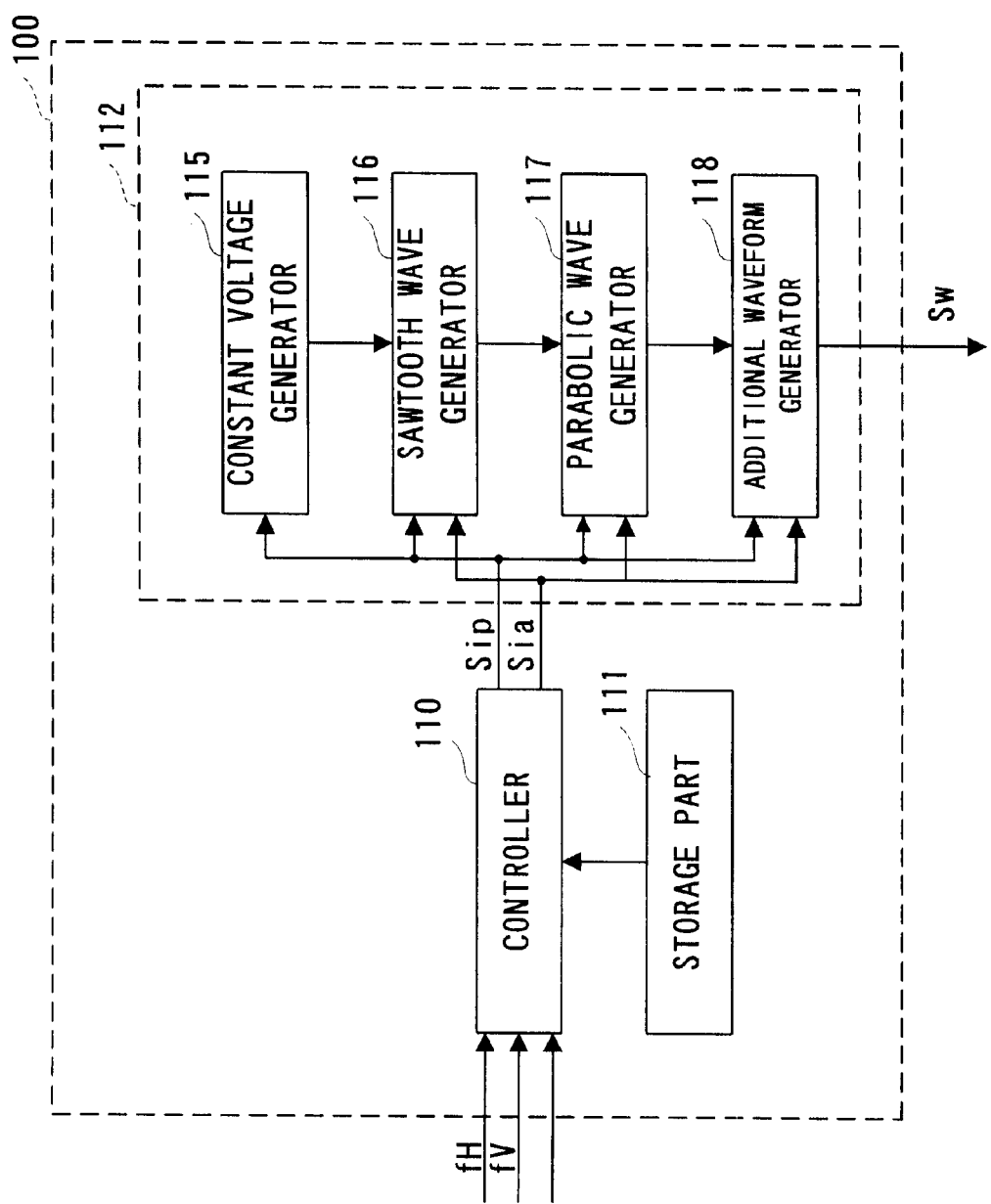
FIG. 28 is a block diagram showing the structure of a distortion-correcting waveform generator for use in the horizontal correction apparatus shown in FIG. 27.
Figure 29:
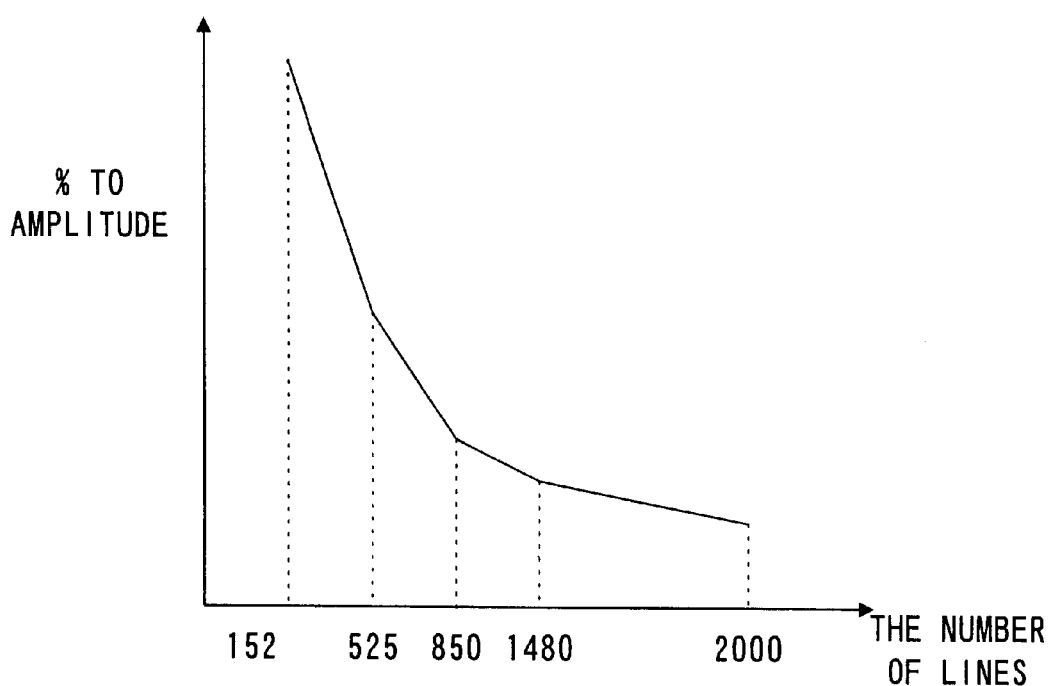
FIG. 29 is a diagram illustrating the relation between the number of horizontal lines recorded in a storage device shown in FIG. 28 and the amount of amplitude of an additional signal to be added to a sawtooth wave.

With reference to FIG. 27, 28, and 29, a fifth embodiment of the present invention is described below. As described above in the fourth embodiment, when a sawtooth wave (wave signal Sw) is superposed on the VCO 31 of the PLL circuit 14 to correct parallelogram distortion, the phase has to be recovered in the vertical feedback period from the lower part to the upper part of the raster frame Fr. At this time, since the PLL circuit 14 corrects the phase difference for each H pulse Hp, the number of H pulses Hp during the vertical feedback period becomes one of the factors for phase convergence.

Therefore, an angle SE to be superposed on the correction wave (wave signal Sw) depends on the number of lines of the video signals to be supplied. That is, as the number of lines of the input video is larger, the phase difference between the H pulse Hp and the flyback pulse FBP on the upper and lower parts of the frame as described above can be converged more easily in the vertical blanking period. In other words, with the large number of lines of the input video, the amplitude of the additional waveform does not have to be large. In view of this, the present embodiment varies the amount of amplitude in the angular part to be added to the correction wave according to the number of lines of input video.

With reference to FIG. 27, described is a CRT display apparatus with a horizontal deflection controller according to the present embodiment incorporated therein. The CRT display apparatus PcrtR is constructed as the CRT display apparatus Pcrt of FIG. 1 with a vertical horizontal frequency detector 104 further provided therefor, and with the horizontal distortion correction apparatus HDCpr replaced with a horizontal distortion correction apparatus HDCp. The vertical horizontal frequency detector 104 is connected to an external video signal source, and detects a horizontal frequency fH and a vertical frequency fV from the input signal Si and supplying the same to the waveform generator 100 of the horizontal distortion correction apparatus HDCpr.

As shown in FIG. 28, the waveform generator 100 includes a controller 110, a storage device 111, and a waveform generator 112. The controller 110 is connected to the vertical horizontal frequency detector 104, and calculates the number of lines (fH/fV) according to the supplied horizontal frequency fH and vertical frequency fV. The relation between the number of horizontal lines and the amplitude of the additional waveform is previously recorded in the storage device 111. According to this relation and the amount of correction supplied from the waveform adjuster 100f by the user, the waveform generator 112 generates a correction wave, and supplies the same to the PLL circuit 14.

FIG. 29 exemplarily shows the relation between the number of horizontal lines and the amplitude of the additional signal to be added to the sawtooth wave (wave signal Sw). The actual values are correctly determined in consideration of the characteristics of the PLL circuit 14 for use and the response of the other circuits. In the example shown in the drawing, the amplitudes of the additional signal with which the upper part of the frame is not distorted are specifically calculated at five points where the numbers of lines are 152, 525, 850, 1480, and 2000, and the other values are determined by linear interpolation of the relation of these amplitudes.

Sixth Embodiment

Figure 30:
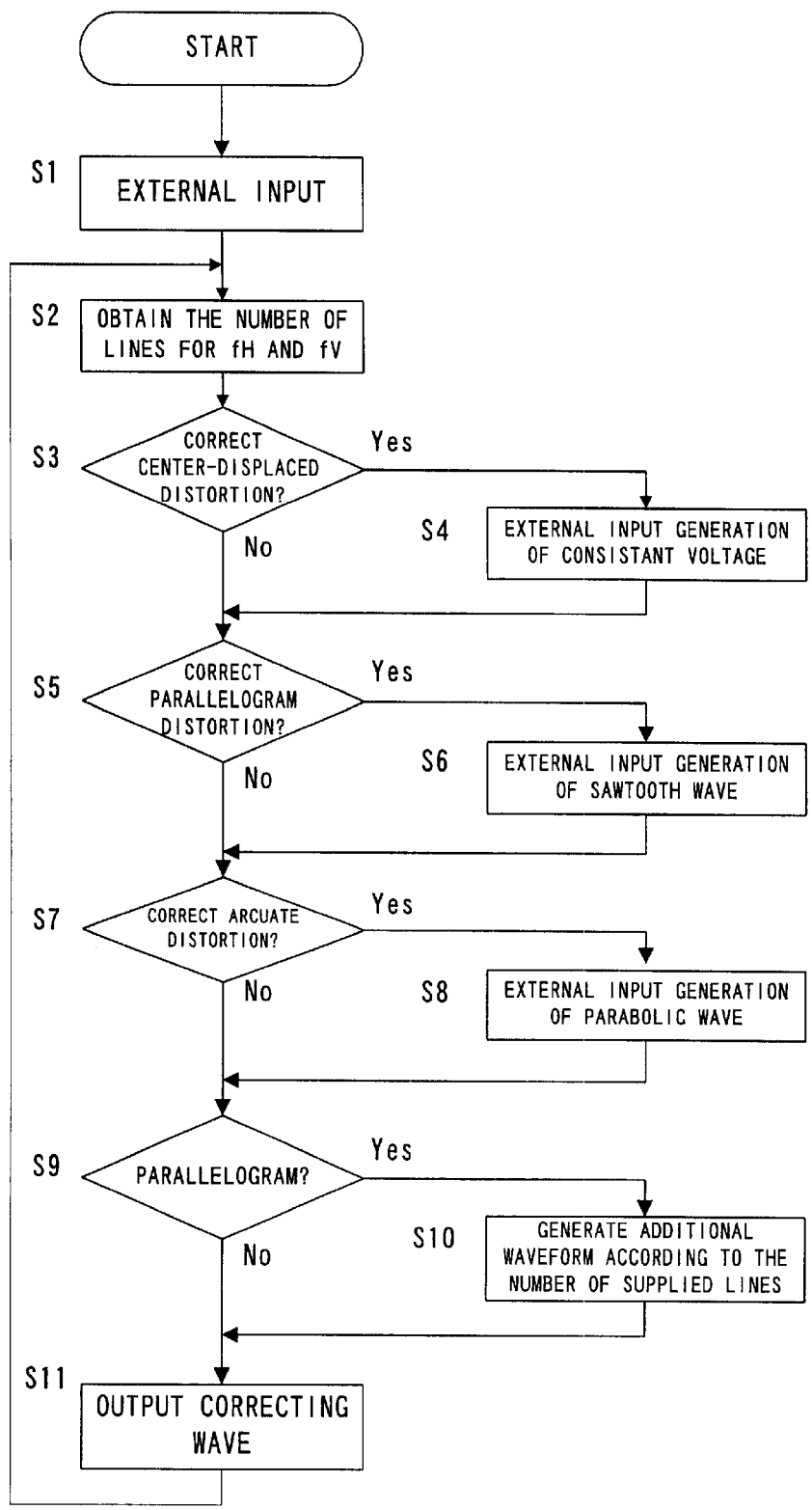
FIG. 30 is a flow chart showing the operation of the horizontal distortion correction apparatus shown in FIG. 27.
Figure 31:
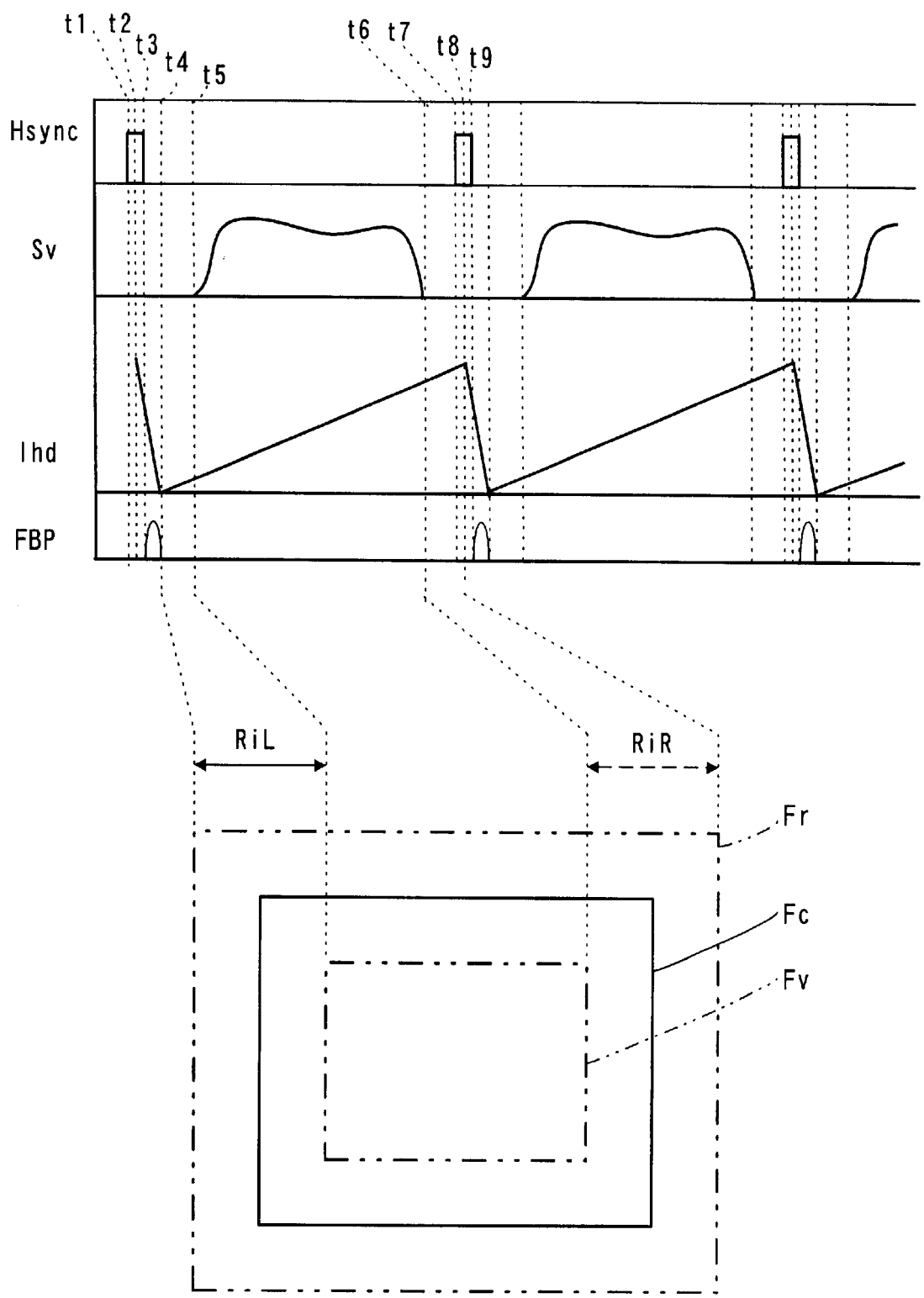
FIG. 31 is a diagram illustrating the relation between various signals for producing a video signal and the frames displayed on the CRT display apparatus.
Figure 32:
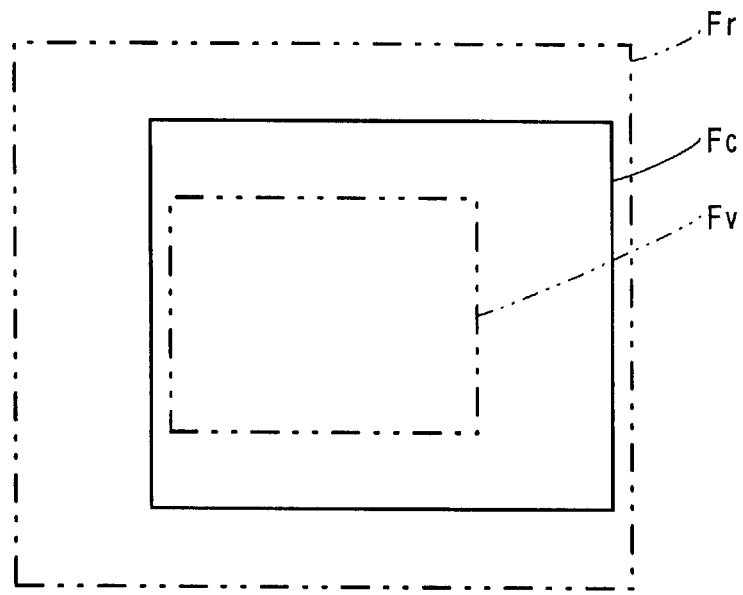
FIG. 32 is a diagram showing an example of center-displaced distortion of an image displayed on the CRT display apparatus.
Figure 33:
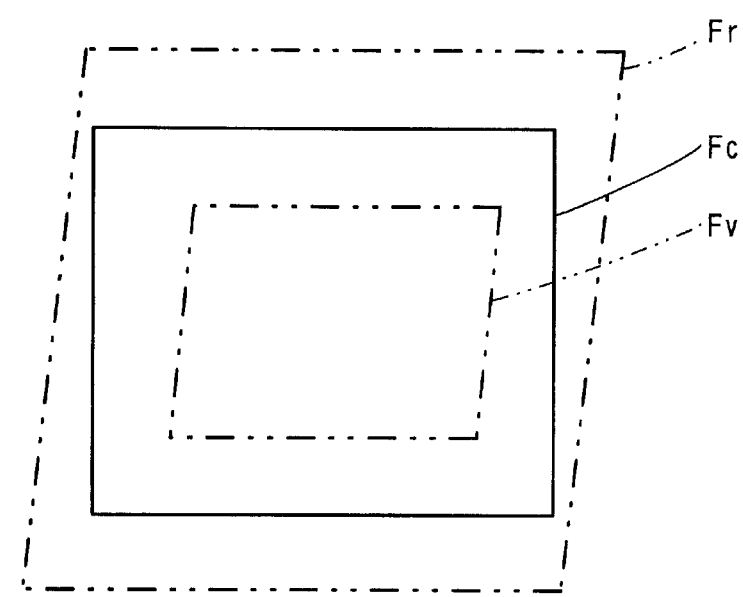
FIG. 33 is a diagram illustrating an example of parallelogram distortion of an image displayed on the CRT display device.
Figure 34:
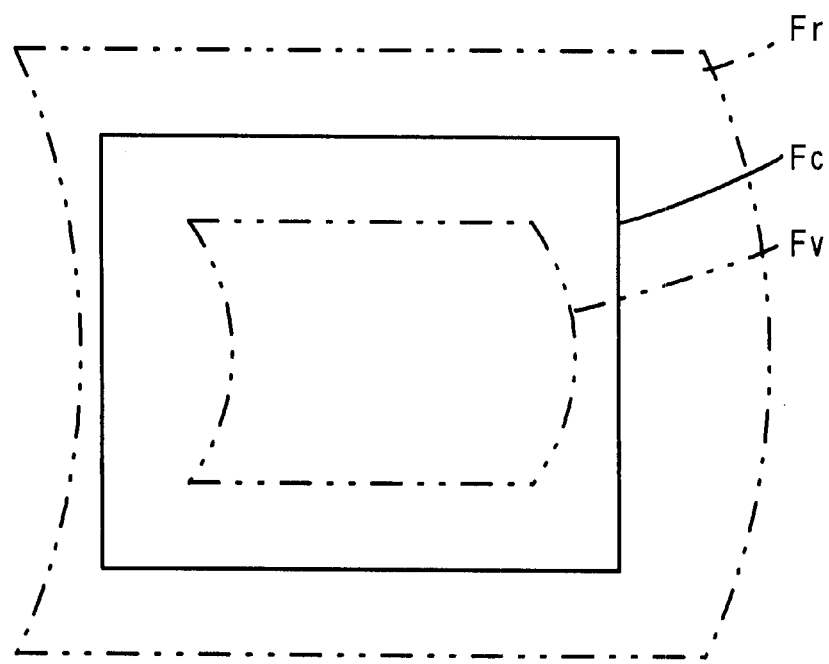
FIG. 34 is a diagram illustrating an example of arcuate distortion of an image displayed on the CRT display apparatus.
Figure 35:
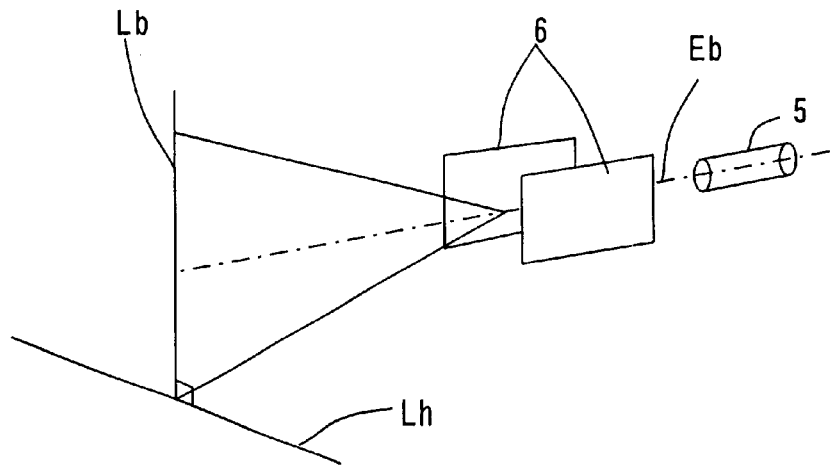
FIG. 35 is a diagram illustrating a display when an electron beam deflector is normally mounted onto the CRT display apparatus.

With reference to FIG. 30, a sixth embodiment of the present invention is described below. Prior to that, the structure of the above waveform generator 100 is described in detail with reference to FIG. 28. The distortion-correcting waveform generator 100 is constructed of the controller 110, the storage device 111, and the waveform generator 112. The waveform generator 112 is constructed of a constant voltage generator 115, a sawtooth wave generator 116, a parabolic wave generator 117, and an additional waveform generator 118. The controller 110 receives inputs of the type and magnitude of the correction wave (wave signal Sw) from the waveform adjuster 100f.

The controller 110 also receives inputs of the horizontal frequency fH and the vertical frequency fV from the vertical horizontal frequency detection 113. Based on these horizontal and vertical frequencies fH and FV, the number of lines of the supplied video signal is calculated. Furthermore, based on the amount of correction supplied, information about amplitude and period is sent to the constant voltage generator 115, the sawtooth wave generator 116, the parabolic wave generator 117, and the additional waveform generator 118.

The constant voltage generator 115 receives signals from the controller 110, generating DC voltage. This constant voltage generator 115 does not receive a period signal from the controller 110 because such signal is not required for direct current. The sawtooth wave generator 116 generates a sawtooth wave according to the supplied amplitude and period signals. The parabolic wave generator 117 generates a parabolic wave according to the same amplitude and period signals. The additional waveform generator 118 generates an additional waveform according to the same amplitude and period signals. Here, the amplitude of the additional waveform generator 118 is obtained not from the supplied amount of correction, but from the relation such as shown in FIG. 29 based on the number of lines calculated from the horizontal frequency fH, the vertical frequency fV, and the information stored in the storage device 111.

The constant voltage generator 115, the sawtooth wave generator 116, the parabolic wave generator 117, and the additional waveform generator 118 are serially connected, and the final output is the sum of outputs from each generator.

The operation of the distortion-correcting waveform generator 100 is now described with reference to a flow chart shown in FIG. 30.

First, in step S1, the distortion-correcting waveform generator 100 receives input instruction from an external device. The procedure then advances to the next step S2.

In step S2, the number of lines is calculated based on the horizontal frequency fH and the vertical frequency fV. The procedure then advances to the next step S3.

In step S3, it is determined whether the external input includes an instruction of correcting center-displaced distortion. If such instruction is included, Yes is determined, and the procedure then advances to step S4.

In step S4, DC voltage is generated in the constant voltage generator 115 for the external input. The procedure then advances to step S5.

On the other hand, if No, the procedure advances to the next step S5.

In step S5, it is determined whether the external instruction includes an instruction of correcting of parallelogram distortion. If such instruction is included, Yes is determined, and the procedure then advances to step S6.

In step S6, a sawtooth wave is generated in the sawtooth wave generator 116 with the amplitude and period of the input. The procedure then advances to the next step S7.

On the other hand, if No, the procedure advances to step S7.

In step S7, it is determined whether the external instruction includes instruction of correcting arcuate distortion. If such instruction is included, Yes is determined, and the procedure then advances to step S8.

In step S8, a parabolic wave is generated in the parabolic wave generator 117 with the amplitude of the input. The procedure then advances to step S9.

In step S9, it is determined whether the output includes an instruction of correcting parallelogram distortion. If such instruction is included, Yes is determined, and the procedure then advances to step S10.

In step S10, an additional waveform is generated in the additional waveform generator 118 according to the number of supplied lines. The procedure then advances to step S11.

On the other hand, when No, the procedure advances to the next step S11.

In step S11, if the distortion is not parallelogram distortion, the H pulse Hp and the FBP have the same phase difference from the upper to lower part of the frame. It is therefore not required to consider problems such as convergence of phase correction in the PLL circuit 14, and thus no additional waveform is required.

If correction of parallelogram distortion is included, it is required to superpose the additional waveform for causing the phase correction to converge into the upper part of the frame. Therefore, the number of lines is calculated from the supplied fH and fV signals supplied to the controller, and then the additional waveform is calculated and generated by interpolating data previously stored in the storage device 111. With such distortion-correcting waveform generator 100, the horizontal deflection control apparatuses according to the first to fifth embodiments can be realized.

As described above for its construction, waveforms can be generated independently. Moreover, these waveforms may be generated simultaneously in a multiplex form.

Further, in the first to fifth embodiments, it is assumed that the H pulse synchronizes with the horizontal synchronizing signal Hsync. However, the horizontal synchronizing signal Hsync and the H pulse Hp may be previously shifted in phase with another method, and when the waveform generator of the present invention generates constant voltage, the image appears at the center of the raster. For example, the shift is made when the H pulse Hp is generated in the signal separation controller 11 from the supplied video signal. At this time, the constant voltage generator always produces constant voltage for the bias.

INDUSTRIAL APPLICABILITY

As described above, in a computer CRT display apparatus supporting various scanning frequencies, the present invention can be effectively used for a horizontal distortion correction apparatus of controlling horizontal distortion inevitable due to assembly error at manufacturing with a control signal of a small current.

What is claimed is:

1. A horizontal distortion correction apparatus for correcting horizontal distortion caused by an assembly error of a CRT display apparatus that displays an image by scanning a video signal, based on a horizontal synchronizing signal included in the video signal; comprising:
   deflecting means for deflecting an electron beam to display the image on the CRT;
   a PLL circuit operable to control a display position oft he image by applying a horizontal pulse in synchronization with the horizontal synchronizing signal to said deflecting means; and
   residual phase adding means for providing a residual phase for said PLL circuit to shift a phase of said horizontal pulse in a direction so as to cancel out the horizontal distortion;
   said PLL circuit comprising:
      a phase comparator operable to compare the horizontal pulse with a flyback pulse to produce a phase difference signal indicative of a difference between the horizontal pulse and the flyback pulse indicative of a start of horizontal deflection scanning for each horizontal synchronization period;
      a low pass filter operable to convert the phase difference signal into a DC phase difference voltage based on a modulation signal;
      a distortion-correcting wave form generator operable to produce the modulation signal to modulate the DC phase difference voltage;
      a resistor;
      a waveform adjuster connected through said resistor to said distortion-correcting wave form generator operable to adjust the wave form of the modulation signal;
      a voltage controlled oscillator operable to produce an oscillation signal having a frequency corresponding to the phase difference signal based on the DC phase difference voltage;
      a 1/N frequency divider operable to divide the oscillation signal into a predetermined frequency to produce a frequency-divided signal;
      a pulse generator operable to produce a pulse having a predetermined duty ratio based on the frequency-divided signal; and
      a horizontal output device operable to produce a horizontal deflection current and the flyback pulse based on the pulse;
   wherein the modulated signal is supplied to the PLL circuit to control the phase of the horizontal pulse so that the image scanned in a horizontal direction is displayed without distortion in the horizontal direction.

2. The horizontal distortion correction apparatus as claimed in claim 1, wherein
   the modulated signal has a sawtooth waveform, capable of correcting parallelogram distortion of the image.

3. A horizontal distortion correction method for correcting horizontal distortion caused by an assembly error of a CRT apparatus that displays an image by scanning a video signal, based on a horizontal synchronizing signal included in the video signal, comprising:
   deflecting an electron beam to display the image on the CRT;
   controlling a display position of the image by applying a horizontal pulse in synchronization with the horizontal synchronizing signal;
   providing a residual phase to shift a phase of the horizontal pulse in a direction so as to cancel out the horizontal distortion;
   comparing the horizontal pulse with a flyback pulse to produce a phase difference signal indicative of a difference between the horizontal pulse and the flyback pulse indicative of a start of horizontal deflection scanning for each horizontal synchronization period;
   converting, via low pass filtering, the phase difference signal into a DC phase difference voltage based on a modulation signal;
   adjusting the waveform of the modulation signal;
   producing an oscillation signal having a frequency corresponding to the phase difference signal based on the DC phase difference voltage;
   dividing the oscillation signal into a predetermined frequency to produce a frequency-divided signal;
   producing a pulse having a predetermined duty ratio based on the frequency-divided signal; and
   producing a horizontal deflection current and the flyback pulse based on the pulse;
   wherein the modulated signal controls the phase of the horizontal pulse so that the image scanned in a horizontal direction is displayed without distortion in the horizontal direction.

* * * * *